(12) United States Patent
Geiger et al.

(10) Patent No.: US 11,560,339 B2
(45) Date of Patent: Jan. 24, 2023

(54) MICRONUTRIENT FOLIAR SOLUTIONS

(71) Applicant: KOCH AGRONOMIC SERVICES, LLC, Wichita, KS (US)

(72) Inventors: Robert A. Geiger, Denton, TX (US); Ithamar Prada, São Paulo (BR); Elliott Martin, Olathe, KS (US); Raju Khatiwada, Overland Park, KS (US)

(73) Assignee: Koch Agronomie Services, LLC, Wichita, KS (US)

( * ) Notice: Subject to any disclaimer, the term of this patent is extended or adjusted under 35 U.S.C. 154(b) by 0 days.

(21) Appl. No.: 16/888,689

(22) Filed: May 30, 2020

(65) Prior Publication Data

US 2020/0377426 A1    Dec. 3, 2020

Related U.S. Application Data

(60) Provisional application No. 62/854,692, filed on May 30, 2019.

(51) Int. Cl.
| | |
|---|---|
| *C05D 9/02* | (2006.01) |
| *A01C 21/00* | (2006.01) |
| *C05G 5/20* | (2020.01) |

(52) U.S. Cl.
CPC .............. *C05D 9/02* (2013.01); *A01C 21/005* (2013.01); *C05G 5/20* (2020.02)

(58) Field of Classification Search
None
See application file for complete search history.

(56) References Cited

U.S. PATENT DOCUMENTS

| | | | | |
|---|---|---|---|---|
| 4,960,452 A | * | 10/1990 | Brokken | C05G 5/23 71/64.1 |
| 6,312,493 B1 | | 11/2001 | Eltink et al. | |
| 6,328,780 B1 | * | 12/2001 | Bull | C05D 9/02 71/31 |
| 6,383,245 B1 | | 5/2002 | Yamashita | |
| 6,461,664 B1 | * | 10/2002 | Ciribolla | C05D 9/02 426/656 |
| 6,521,247 B1 | | 2/2003 | deVries | |
| 6,572,908 B2 | | 6/2003 | Kemp et al. | |

(Continued)

FOREIGN PATENT DOCUMENTS

| | | |
|---|---|---|
| CN | 102026940 | 4/2014 |
| WO | 2009151677 | 12/2009 |

(Continued)

OTHER PUBLICATIONS

Calcium citrate malate, Wikipedia, page last updated Sep. 12, 2020, 1 page.

(Continued)

*Primary Examiner* — Wayne A Langel

(57) ABSTRACT

The present disclosure provides novel compositions and methods of forming those compositions by complexing a micronutrient with at least two organic acids, preferably in the presence of a base to form an aqueous formulation. Compositions comprising the complexed micronutrient are tank mix compatible and can be used to deliver a water-soluble source of the particular micronutrient to plants (e.g., corn plants), with foliar application being particularly preferred.

16 Claims, 8 Drawing Sheets
(1 of 8 Drawing Sheet(s) Filed in Color)

(56) References Cited

U.S. PATENT DOCUMENTS

| | | | |
|---|---|---|---|
| 6,670,494 B1 | 12/2003 | Trusovs | |
| 6,716,814 B2 | 4/2004 | Ericson et al. | |
| 6,826,866 B2* | 12/2004 | Moore | C05G 3/50 |
| | | | 71/64.1 |
| 6,903,235 B2 | 6/2005 | Hsiao et al. | |
| 7,090,882 B2 | 8/2006 | Koefod et al. | |
| 7,351,853 B2 | 4/2008 | Kreitlow | |
| 7,569,506 B2 | 8/2009 | Foerster | |
| 7,588,696 B2 | 9/2009 | Koefod | |
| 7,687,650 B2 | 3/2010 | Ramirez et al. | |
| 7,767,851 B2 | 8/2010 | Kwok et al. | |
| 7,858,549 B2 | 12/2010 | Foerster | |
| 7,910,732 B2 | 3/2011 | Schubert et al. | |
| 8,007,846 B2 | 8/2011 | Thompson et al. | |
| 8,178,709 B2 | 5/2012 | Nelson et al. | |
| 8,299,298 B2 | 10/2012 | Chan et al. | |
| 8,338,642 B2 | 12/2012 | Kwok et al. | |
| 8,378,131 B2 | 2/2013 | Gleason et al. | |
| 8,652,231 B2 | 2/2014 | Fuentes et al. | |
| 9,328,133 B2 | 5/2016 | Kwok et al. | |
| 9,352,489 B2 | 5/2016 | Maspoch Comamala et al. | |
| 9,414,599 B2 | 8/2016 | Leonardi | |
| 9,522,830 B2 | 12/2016 | Smith et al. | |
| 9,540,291 B2 | 1/2017 | Wheeler et al. | |
| 9,540,308 B2 | 1/2017 | Matsuo et al. | |
| 9,624,155 B2 | 4/2017 | Ando et al. | |
| 9,663,409 B2 | 5/2017 | Fanning et al. | |
| 9,908,821 B2 | 3/2018 | Brown et al. | |
| 10,167,238 B2 | 1/2019 | Brown et al. | |
| 10,688,068 B2 | 6/2020 | Hernandez Miramontes et al. | |
| 2002/0088262 A1* | 7/2002 | Daniels | C05D 9/02 |
| | | | 71/64.1 |
| 2006/0084573 A1* | 4/2006 | Grech | C05B 17/00 |
| | | | 504/101 |
| 2009/0038355 A1* | 2/2009 | Marks | C05D 5/00 |
| | | | 71/27 |
| 2010/0311583 A1 | 12/2010 | Laurent et al. | |
| 2014/0260466 A1* | 9/2014 | Rehage | C11D 7/5004 |
| | | | 252/88.1 |
| 2015/0376076 A1 | 12/2015 | Ward et al. | |
| 2016/0332929 A1* | 11/2016 | McKnight | C05C 9/005 |
| 2017/0283334 A1* | 10/2017 | Rohrer | C05D 9/02 |
| 2018/0213787 A1* | 8/2018 | Sheth | A01N 47/30 |
| 2019/0029266 A1* | 1/2019 | Sawant | A01N 59/16 |
| 2019/0161418 A1* | 5/2019 | Meredith | A01N 25/30 |
| 2022/0332660 A1* | 10/2022 | Dickess | A01N 43/54 |

FOREIGN PATENT DOCUMENTS

| | | | |
|---|---|---|---|
| WO | 2012097155 | 7/2012 | |
| WO | 2012099139 | 7/2012 | |
| WO | 2013050402 | 4/2013 | |
| WO | 2013121244 | 8/2013 | |
| WO | 2013140136 | 9/2013 | |
| WO | 2013176731 | 11/2013 | |
| WO | 2013187535 | 12/2013 | |
| WO | 2014120730 | 8/2014 | |
| WO | 2014151491 | 9/2014 | |
| WO | 2014191961 | 12/2014 | |
| WO | 2015036374 | 3/2015 | |
| WO | 2015110968 | 7/2015 | |
| WO | 2016040564 | 3/2016 | |
| WO | 2016044768 | 3/2016 | |
| WO | 2016075709 | 5/2016 | |
| WO | 2016089750 | 6/2016 | |
| WO | 2016092566 | 6/2016 | |
| WO | 2016098131 | 6/2016 | |
| WO | 2014030523 | 7/2016 | |
| WO | 2016153331 | 9/2016 | |
| WO | 2016162888 | 10/2016 | |
| WO | 2017021921 | 2/2017 | |
| WO | 2017060441 | 4/2017 | |
| WO | 2017092978 | 6/2017 | |
| WO | 2018034864 | 2/2018 | |
| WO | 2018213289 | 11/2018 | |
| WO | WO 2019/086023 A1 * | 5/2019 | C05G 3/00 |

OTHER PUBLICATIONS

Arnon, D. I. (1949). Copper Enzymes in Isolated Chloroplasts. Polyphenoloxidase in Beta vulgaris. Plant Physiology, 24(1), 1.

International Search Report and Written Opinion dated Sep. 22, 2020 in corresponding PCT/US2020/035460 filed May 30, 2020, 10 pages.

* cited by examiner

US 11,560,339 B2

MICRONUTRIENT FOLIAR SOLUTIONS

RELATED APPLICATIONS

The present application claims the priority benefit of U.S. Provisional Patent Application Ser. No. 62/854,692, filed May 30, 2019, entitled MICRONUTRIENT FOLIAR SOLUTIONS, incorporated by reference in its entirety herein.

BACKGROUND

Field

This disclosure relates generally to foliar solutions for providing micronutrients to plants.

Description of Related Art

Foliar solutions have been used to deliver micronutrients to crops and other plants, but there are limited options available, and those options generally suffer drawbacks. For example, iron sulfate solutions have been used to deliver iron to plants because iron sulfate provides a source of iron that can be readily taken up by plants. However, care must be taken when using iron sulfate solutions because they are incompatible with other commonly used crop protectants or treatments. Avoiding this issue requires multiple treatment steps spaced sufficiently apart in time that the treatments cannot negatively impact one another. While this problem is referenced with respect to iron supplementation, the problem is more severe with other metals, such as zinc and manganese. Additionally, while some commercially available alternatives may avoid compatibility issues with crop protectants, they suffer from inefficient plant uptake and other performance shortcomings. There is a need for alternative products that lessen or even eliminate the compatibility issues while also providing strong micronutrient delivery.

SUMMARY

The present disclosure provides a nutrient formulation comprising a micronutrient complexed with first and second organic acids.

In another embodiment, a method of providing nutrients to plants is provided. The method comprises contacting a nutrient formulation with the plant and/or soil in which the plant is or will be planted. The nutrient formulation comprises a micronutrient complexed with first and second organic acids.

In a further embodiment, the combination of a plant and a nutrient formulation on at least some of the plant is disclosed. The nutrient formulation comprises a micronutrient complexed with first and second organic acids.

In yet another embodiment, the disclosure provides a method of forming a nutrient formulation comprising reacting a source of a micronutrient with at least two organic acids in the presence of water and a base so as to form a non-chelated complex of the micronutrient with at least one of the organic acids.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 is a photograph showing several solutions with different metals formed as described in Example 2.

This disclosure is concerned with a foliar nutrient product that incorporates a complex of organic acids with a micronutrient, and particularly a metal micronutrient, thus forming substantially, or even fully, water-soluble metal complexes. As used herein, "micronutrient" refers to elements typically required in small or trace amounts for plant growth and, unless stated otherwise, is intended to include zinc, nickel, copper, manganese, iron, cobalt, selenium, titanium, lanthanum, and/or mixtures thereof, and/or sources of the foregoing. A "source" of a micronutrient is meant to refer to a compound containing the element (e.g., $FeSO_4$) or the element itself (e.g., Fe), unless stated otherwise.

In more detail, organic acids are used to form coordination complexes between a micronutrient and one or more organic acids. Examples of preferred organic acids include those selected from the group consisting of citric acid, malic acid, oxalic acid, malonic acid, succinic acid, glutaric acid, adipic acid, aconitic acid, tartaric acid, fumaric acid, propane-1,2,3-tricarboxylic acid, trimesic acid, glutaconic acid, mesaconic acid, tartronic acid, aspartic acid, pimelic acid, suberic acid, azelaic acid, sebacic acid, and combinations of the foregoing.

There are preferably at least two different organic acids utilized. Even more preferably, one organic acid is a dicarboxylic acid (preferably a $C_2$-$C_{10}$, and more preferably a $C_2$-$C_6$ dicarboxylic acid) and one organic acid is a tricarboxylic acid (preferably a $C_6$-$C_{10}$ tricarboxylic acid). The most preferred combination is citric acid for the tricarboxylic acid and malic acid for the dicarboxylic acid.

As noted above, the organic acids are complexed with one or more metal micronutrients. Suitable sources of the metal micronutrient include sulfates, chlorides, citrates, and/or nitrates of the foregoing micronutrients.

A preferred complex according to this disclosure can be represented by:

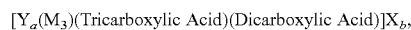

[$Y_a(M_3)$(Tricarboxylic Acid)(Dicarboxylic Acid)]$X_b$, where:
"X" is selected from the group consisting of —Cl, —$SO_4$, and —$NO_3$;
"Y" is selected from the group consisting of —$NH_4$, —Na, —Mg, —K, and —Ca;
"a" and "b" are at least 1 and can be as high as permitted for required by the particular chemistry selected;
"M" is a metal micronutrient with various oxidation states, such as those metals listed above;
Tricarboxylic Acid is selected from the group consisting of citric acid, aconitic acid, propane-1,2,3-tricarboxylic acid, and trimesic acid; and
Dicarboxylic Acid is selected from the group consisting of malic acid, malonic acid, succinic acid, fumaric acid, glutaconic acid, mesaconic acid, tartronic acid, aspartic acid, tartaric acid, oxalic acid, glutaric acid, adipic acid, pimelic acid, suberic acid, azelaic acid, and sebacic acid.

It is preferred that the molar ratio of tricarboxylic acid (e.g., citric acid) to dicarboxylic acid (e.g., malic acid) is from about 30:70 to about 70:30, preferably from about 40:60 to about 60:40, more preferably from about 45:55 to about 55:45, with the most preferred ratio being about 50:50.

Preferred bases include those selected from the group consisting of NaOH, KOH, $Mg(OH)_2$, $Ca(OH)_2$, $NH_4OH$, and mixtures thereof. Preferably the base is provided at levels of from about 10% to about 20% by weight, preferably from about 13% to about 17% by weight, and more preferably about 15%, based upon the total weight of all ingredients used to make the formulation.

The source of micronutrient is provided at sufficient levels that the micronutrient is present in the final aqueous formulation at levels of at least about 4% by weight, preferably at least about 4.5% weight, more preferably at least about 5% by weight, and even more preferably from about 5% to about 10% by weight, based upon the weight of the final aqueous formulation taken as 100% by weight.

The following shows an exemplary reaction and one possible resulting complex formed according to the disclosure when citric acid and malic acid are used as the organic acids, and X, M, and Y are as indicated.

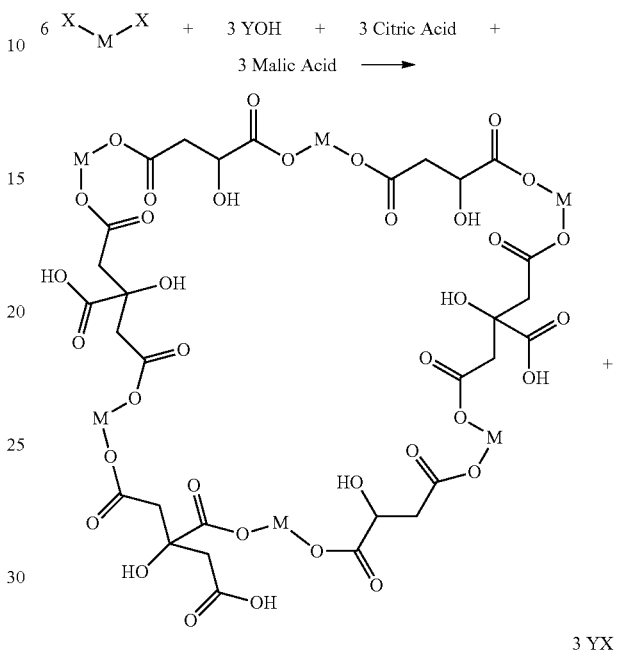

In the foregoing, each M is chosen from Mn, Fe, Ni, Cu, Co, Zn, Se, Ti, and La; X is chosen from —$SO_4$, —Cl, —$NO_3$, —O, or —$CO_3$; and each Y is chosen from Na, K, Mg, Ca, and/or $NH_4$. One skilled in the art will appreciate that whether there is one X group or two X groups in the reactants as well as in the reaction products will depend upon the selection of M, Y, and X. Additionally, in instances where Y is Ca or Mg, YOH will actually be $Y(OH)_2$.

Although the foregoing structure schematically depicts a large ringed structure, it is highly likely that the majority, and maybe even all, of the complexed metal atoms will exist as moieties of the foregoing. For example, the reaction described herein could result in one or more of the following:
(i) a metal atom complexed with two different molecules of the same organic acid (e.g., two different citric acid molecules);
(ii) a metal atom complexed with both a molecule of a first organic acid and a molecule of a second organic acid (e.g., both a citric acid molecule and a malic acid molecule);
(iii) a single organic acid molecule complexed with only one metal atom;
(iv) a single organic acid molecule complexed with two or more metal atoms of the same type;
(v) a single organic acid molecule complexed with two or more metal atoms of different types;
(vi) a reaction product blend of (i), (ii), (iii), (iv), and/or (v).

Importantly and as illustrated in the above schematic, the reaction that takes place according to the present disclosure is preferably not a chelation reaction. In a chelation reaction, a chelating agent has at least two sites on a single molecule through which that single chelating molecule bonds with the same metal atom. While all chelates are complexes, not all complexes are chelates, and in the present disclosure, the reaction preferably results in a non-chelated complex. In other words, each organic acid molecule preferably forms only a single bond with a particular metal atom. Any other bonds that same organic acid molecule forms with a metal atom will preferably be with a different metal atom (even if the same type of metal atom), as shown in the above reaction scheme. Similarly, the metal atom can, and preferably does, form more than one bond, but not with the same organic acid molecule.

In some embodiments, a surfactant or surfactant blend is provided, with non-ionic surfactants being particularly preferred. Examples of preferred surfactants include those chosen from glycerol, 1-deoxy-1-(methyl-($C_8$-$C_{10}$-(even)-alkanoyl)amino)-D-glucitol, dioctylsulfo-succinate sodium salts, octyl (2-ethylhexyl) iminodipropionate, and mixtures of the foregoing.

Table A provides some ranges of ingredients in the foliar formulations described herein. The present disclosure is intended to include embodiments where the ranges of Table A are "mixed and matched" (e.g., the broadest range of one ingredient is used with the most preferred range of a different ingredient).

TABLE A

| INGREDIENT | BROADEST RANGE[B] | PREFERRED RANGE[B] | MORE PREFERRED RANGE[B] |
|---|---|---|---|
| Micronutrient[A] | About 4% or greater | About 4% to about 15% | About 5% to about 12% |
| Total Bases | About 2% to about 45% | About 3% to about 25% | About 2% to about 6% |
| Total Acids | About 7% to about 30% | About 10% to about 25% | About 10% to about 21% |
| Surfactants[C] | About 0.01% to about 4% | About 0.1% to about 3% | About 0.25% to about 2% |
| Cation from Base | About 1% to about 10% | About 2% to about 10% | About 4% to about 10% |
| Sulfate from Micronutrient Source[D] | About 1% to about 15% | About 3% to about 10% | About 4.5% to about 8% |
| Chloride from Micronutrient Source[E] | About 1% to about 15% | About 5% to about 13% | About 8% to about 13% |
| Nitrogen[F] | About 0.5% to about 10% | About 1% to about 8% | About 3% to about 8% |
| Water | About 20% to about 75% | About 35% to about 70% | About 40% to about 65% |

[A]Source of the micronutrient provided in sufficient quantities to achieve these micronutrient quantities.
[B]% by weight, based on total weight of all ingredients in composition taken as 100% by weight.
[C]In embodiments where at least one surfactant is included. In some embodiments, the formulation does not include any surfactants (i.e., 0% by weight).
[D]In embodiments where a sulfate is used as the micronutrient source. In some embodiments, the formulation does not include any sulfates (i.e., 0% by weight).
[E]In embodiments where a chloride is used as the micronutrient source. In some embodiments, the formulation does not include any chlorides (i.e., 0% by weight).
[F]In embodiments where ammonium hydroxide is used as the micronutrient source. In some embodiments, the formulation does not include any nitrogen (i.e., 0% by weight).

Table B provides some ranges of ingredients in the foliar formulations described herein. The present disclosure is also intended to include embodiments where the ranges of Table B are "mixed and matched" (e.g., the broadest range of one set of ingredient ratios is used with the most preferred range of a different set of ingredient ratios).

TABLE B

| RATIO TYPE[A] | BROADEST RANGE[B] | PREFERRED RANGE[B] | MORE PREFERRED RANGE[B] |
|---|---|---|---|
| Tricarboxylic Acid:Dicarboxylic Acid | About 30:70 to about 70:30 | About 40:60 to about 60:40 | About 45:55 to about 55:45 |
| Acid:Metal ($H^+$:Me) | About 1:3 to about 3:1 | About 1:2 to about 2:1 | About 1:1 |
| Acid:Base($H^+$:$OH^-$) | About 1:3 to about 3:1 | About 1:2 to about 2:1 | About 1:1 |

[A]Refers to total of the metal (micronutrient), base (as $OH^-$), and/or acid (as $H^+$) present in the formulation, in instances where there is more than one metal, base, and/or acid utilized.
[B]Refer to molar ratios.

In one embodiment, the molar ratio of metal:base:acid (Me:$OH^-$:$H^+$) is about 1:1:1.

In another embodiment, iron is the micronutrient of choice, and the formulation is that of Table C.

TABLE C

| COMPONENTS | % BY WEIGHT[A] |
|---|---|
| Iron Source | About 10% to about 25% |
| Sodium hydroxide | About 15% |
| Citric Acid | About 13% |
| Malic Acid | About 8% |
| Water | About 39% to about 54% |

[A]% by weight, based on total weight of all ingredients in composition taken as 100% by weight.

The coordination reaction according to this iron embodiment can be schematically depicted as:

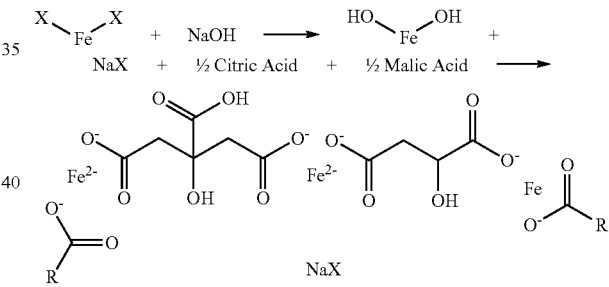

Preferred iron sources are selected from the group consisting of Fe(II)$Cl_2$, Fe(III)$Cl_2$, Fe(III)$NO_3$, Fe(II)$SO_4$, Fe(III)$(SO_4)_3$, and mixtures thereof.

In one embodiment, the formulations described herein are formed by simply mixing a source of the metal micronutrient with the organic acids, a base, and water. However, if a source of Fe(III) is being utilized, it is preferred that the source of Fe(III) be mixed with the acids first, followed by slow addition of the base. The resulting aqueous solution will have a pH of from about 2 to about 6.

In another embodiment, the formulations are formed by heating water to a temperature of from about 140° F. (60° C.) to about 160° F. (71° C.). The micronutrient source is then added slowly to the water followed by mixing until the pH varies by less than about 0.01 for a period of about 1 minute. Preferably, the pH will be from about 2.8 to about 3.7 at this stage, and more preferably from about 3.0 to about 3.5. Next, the base is slowly added to the solution, while mixing. Mixing is again continued until the pH varies by less than about 0.01 for a period of about 1 minute. Preferably, the pH will be from about 6.3 to about 7.2 at this stage, and more preferably from about 6.5 to about 7.0.

After pH consistency is reached, the acid(s) is added while further mixing is carried out. Each acid is added simultaneously rather than sequentially. Again, mixing is continued until the pH varies by less than about 0.01 for a period of about 1 minute. Preferably, the pH will be from about 2.05 to about 2.95 at this stage, and more preferably from about 2.25 to about 2.75. The solution can be complete at this point or, if other ingredients (e.g., surfactants) are utilized, those ingredients can be added at this point, followed by mixing for approximately 15 additional minutes.

Regardless of the formation method, it will be appreciated that the salt (e.g., "YX" in the reaction scheme above) can be left as part of the solution or removed, as desired. Additionally, the product can be left in aqueous form or dried (e.g., by spray-drying) to form a solid composition and diluted later. Regardless, it is preferably applied via foliar or drip irrigation, so that the treatment solution is applied to a plant to be treated. It can be applied to any or all of the plant that has emerged from the soil (or plants growing in a hydroponics environment), but it is particularly preferred that it is at least applied to the leaves of the plant. The composition can be applied as needed during any growth period, including, but not limited to, the V2, V3, V6, and/or R1 growth stages of the particular plant. Preferred plants for use with the methods of the present disclosure include, but are not limited to, soybean plants, tomato plants, corn plants, wheat plants, potato plants, and lettuce plants.

While the application rate can be varied widely, the treatment solution is generally applied to the plant and/or soil at a rate of from about 1 liter of composition per hectare of soil to about 4 liters of composition per hectare of soil, preferably from about 1 liter of composition per hectare of soil to about 3 liters of composition per hectare of soil and more preferably from about 1.5 liters of composition per hectare of soil to about 2.5 liters of composition per hectare of soil.

The disclosure provides a number of advantages over the prior art. For example, the resulting product has an increased total water solubility (at ambient conditions) of at least about 5 times, at least about 10 times, at least about 15 times, at least about 20 times, or even at least about 30 times to about 50 times that of the same micronutrient chelated with citric acid or EDTA, which is a typical prior art product. Water solubility can be measured by adding concentrated/dried product to a solution, measuring the nutrient concentration, and then repeating with higher and higher concentrations until the soluble nutrient concentration flatlines.

Additionally, the product has an increased percentage of complexed metal when compared to these prior art products. That is, when 75% by weight of a micronutrient solution described herein (with 5% by weight of the micronutrient) is mixed 25% by weight of a 50% phosphonate solution and permitted to sit for about one week, the resulting mixture will have less than about 3% by weight precipitate, preferably less than about 2% by weight precipitate, more preferably less than about 1% by weigh precipitate, and even more preferably about 0% by weight precipitate. This property of the product is referred to herein as "degree of complexation."

In one embodiment, following the teachings of the present disclosure results in a total average micronutrient (e.g., iron, zinc) increase in treated plants (about 1 week after treatment) of at least about 20%, preferably at least about 30%, more preferably at least about 40%, and even more preferably from about 55% to about 90% as compared to control plants grown under the exact same conditions but without the treatment of the present disclosure.

In another embodiment, following the teachings of the present disclosure results in a total average micronutrient (e.g., iron, zinc) uptake in treated plants (about 1 week after treatment) of at least about the same or even better as that of a prior art treatment (e.g., iron sulfate, iron chelated with EDTA, zinc sulfate, zinc chelated with EDTA) but without the treatment of the present disclosure. Preferably, the micronutrient uptake in the treated plant is increased by at least about 5%, preferably at least about 10%, more preferably at least about 14%, and even more preferably at least about 20% as compared to plants receiving a prior art treatment.

In either instance, these increased levels can be observed at any stage of growth, but it is particularly preferred that they are observed at the V3 stage and/or early vegetative stage of growth. Additionally, these increased levels can be observed in any plant treated according to the disclosure, but it is particularly preferred that they are observed in corn, leafy lettuce, soybean, and wheat plants. The foregoing can be achieved without negatively affecting the treated plant (i.e., comparable or better root and shoot masses are achieved compared to that of the prior art treatments).

Plants treated according to the disclosure are preferably able to synthesize more chlorophyll than a plant grown under the same conditions except without the use of the inventive treatment composition. A plant that is treated with a formulation of this disclosure at the V3 stage of growth will, at about 1 week after that treatment, have a chlorophyll content that is at least about 5%, preferably at least about 9%, more preferably at least about 15%, and even more preferably about 25% to about 40% greater than the chlorophyll content of the same type of plant after the same weeks of growth and grown under the same conditions but without receiving the foliar treatment according to this disclosure. Chlorophyll levels are determined as described in Example 8.

In one embodiment, a plant treated with a formulation of this disclosure at the V3 stage of growth will, at about 1 week after that treatment, have a chlorophyll content that is at least about 3%, preferably at least about 6%, and more preferably about 6% to about 20% greater than the chlorophyll content of the same type of plant after the same weeks of growth and grown under the same conditions but receiving a prior art foliar treatment (e.g., prior art treatments of Table 3 in Example 8, zinc sulfate, zinc chelated with EDTA) instead of the foliar treatment according to this disclosure.

Additional advantages of the various embodiments described herein will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the disclosure. It is to be understood, however, that these examples are provided by way of illustration, and nothing therein should be taken as a limitation upon the overall scope.

Example 1

Solution Preparation Procedure

Unless specified otherwise, this general preparation procedure was followed in each of the following Examples. For Examples 2-8, blending was carried out at room temperature with room temperature water. For all other Examples, water was heated to about 140-160° F. (60-71° C.), and ingredients were blended with the hot water. In either instance, a source of the particular metal was added slowly to the water, while mixing. The pH was measured every 10-15 minutes and mixing was continued until the pH was about 3.0 to about 3.5 and became consistent (i.e., varied by less than about 0.01 for a period of about 1 minute), which took 30 minutes or longer. After a consistent pH was reached, the base was slowly added to the solution while mixing. Again, the pH was measured about every 10 minutes, and mixing was continued until the pH was about 6.5 to about 7.2 and became consistent (i.e., varied by less than about 0.01 for a period of about 1 minute), which took 30 minutes or longer. Citric acid and malic acid were then added simultaneously to the solution, while mixing. The pH of the solution was measured every 10 minutes and mixing was again continued until the pH was about 2.25 to about 2.75 and became consistent (i.e., varied by less than about 0.01 for a period of about 1 minute), which took 30 minutes or longer. The solution was then filtered over an ⅛-inch (3.175-mm) screen and ready for use.

Example 2

Preparation of Solutions with Different Metals

Following the Example 1 preparation procedure, reaction blends containing 5% by weight metal micronutrient were prepared using sources of Mn, Fe($2+$), Fe($3+$), Ni, Co, Cu, or Zn. NaOH, KOH, Mg(OH)$_2$ or NH$_4$(OH) was utilized for the base, while the two organic acids were provided as part of a citric acid and malic acid mixture. The molar ratio of metal:base (OH$^-$):acid (H$^+$) was 1:1:1. When carrying out the reaction, chloride, nitrate, sulfate, or oxide salts (only for Zn and Mn) were used. The metal hydroxide or oxide is insoluble and becomes soluble when complexed with the organic acid. FIG. 1 shows the various solutions made by this reaction, with the following metals (left to right): Mn$^{2+}$, Fe$^{2+}$, Fe$^{3+}$, Co$^{2+}$, Ni$^{2+}$, Cu$^{2+}$, and Zn$^{2+}$.

Example 3

Preparation of Solutions with Varying Organic Acid Ratios

Fe$^{2+}$ solutions were prepared as described in Example 1, but with varying molar ratios of citric acid to malic acid. The Fe$^{2+}$ source was iron(II) sulfate heptahydrate, and the base used was Mg(OH)$_2$, and it was included at a 1:1 ratio with the metal. The ratio of metal:base:acid was 4:4:3. Other than water, no other ingredients were utilized in this preparation.

Figure 2:
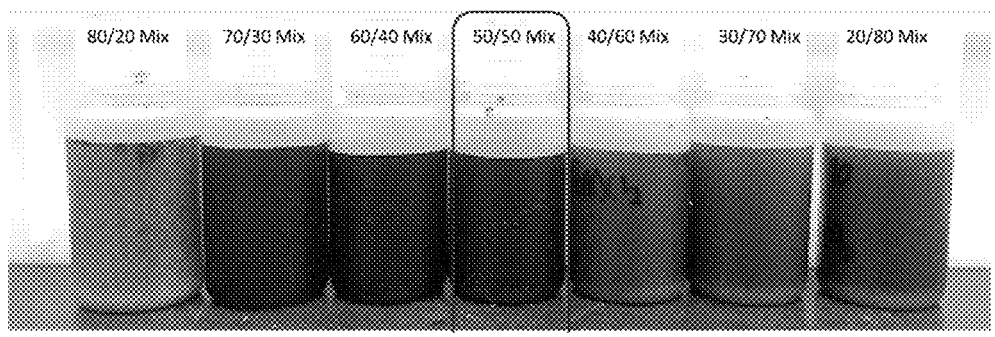
FIG. 2 is a photograph showing several solutions with varying citric acid:malic acid ratios formed as described in Example 3.

FIG. 2 shows bottles of these solutions after being stored at room temperature for 1 week, with the citric acid:malic acid ratio being given at the top of each bottle. The ratio of total organic acids to metal was held constant at 2:3 (acid:metal) but further testing showed this could be varied to be from about 1:3 to about 4:3.

In a further procedure, the above procedure was utilized to make solutions with different mixes of acids to consider various ratios. In all cases, the total organic acid:metal ratio was held constant at 2:3 while varying the organic acid ratios relative to one another, as shown in the following Table 1.

TABLE 1

| REACTION | MOLES OF METAL | MOLES OF CITRIC ACID | MOLES OF MALIC ACID |
|---|---|---|---|
| 80/20 | 0.09 | 0.048 | 0.012 |
| 70/30 | 0.09 | 0.042 | 0.018 |
| 60/40 | 0.09 | 0.036 | 0.024 |
| 50/50 | 0.09 | 0.03 | 0.03 |
| 40/60 | 0.09 | 0.024 | 0.036 |
| 30/70 | 0.09 | 0.018 | 0.042 |
| 20/80 | 0.09 | 0.012 | 0.048 |

It was determined that a 50:50 molar equivalence of acids was particularly preferred for making the water-soluble product described herein.

Example 4

Evaluation of Extent of Coordination Complexing

To evaluate that all available iron was fully coordination complexed, a 5% by weight iron solution ("Solution A") was made following the preparation procedure described in Example 1. The source of iron was iron(II) sulfate heptahydrate, the base utilized was Mg(OH)$_2$, and the citric acid:malic acid ratio was 50:50. The ratio of metal:base:total acid was 4:4:3.

Figure 3:
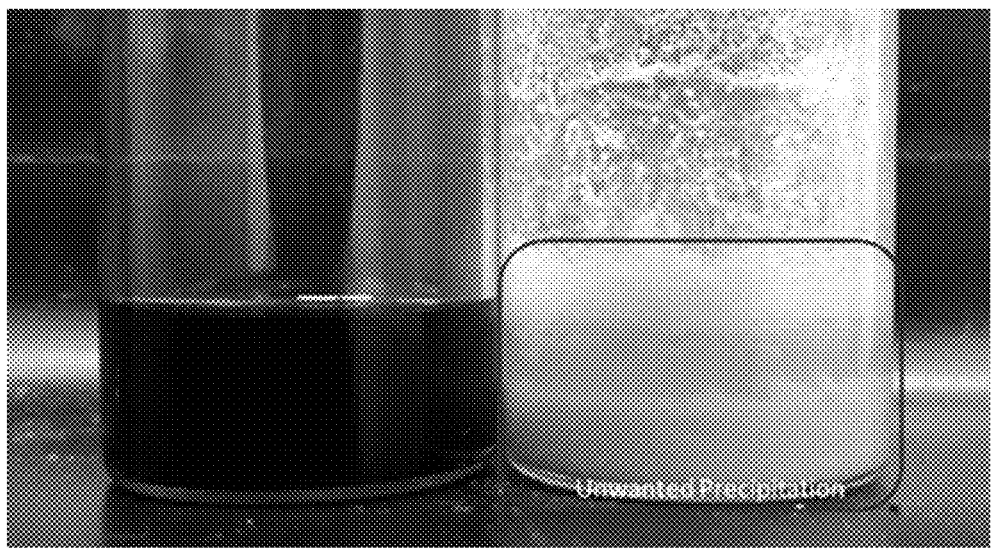
FIG. 3 is a photograph comparing the behavior of a solution according to the disclosure to that of a prior art solution, both in the presence of a phosphonate (Example 4)

Complexing was tested by mixing (at room temperature) 75% by weight of Solution A with 25% by weight of a 50% phosphonate solution. The phosphonate is a strong complexing agent, so free iron in Solution A would react with the phosphonate and form a precipitate. A comparative solution was prepared by mixing 75% of an iron sulfate solution with 25% of the same phosphonate, also under ambient conditions. The solutions were permitted to sit for one week to look for any unwanted precipitation (i.e., iron complexed with the phosphonate). The iron in Solution A (FIG. 3; left) was fully coordinated and complexed, keeping it safe from unwanted precipitation, which was not the case with the comparative solution (FIG. 3; right).

Example 5

Tank Mix Compatibility Study

Solution A described in Example 4 was used to determine compatibility with several commercially available products commonly co-applied with nutrient solutions. In this testing, 75% by weight of solution A was individually mixed under ambient conditions with each of TRIVAPRO® (a fungicide available from Syngenta), HEADLINE® Fungicide (available from BASF), DACONIL® (a fungicide available from Syngenta), ROUNDUP® (herbicide available from Bayer), 2,4-D (herbicide), LIBERTY® Herbicide (available from BASF), XTENDIMAX® Herbicide (available from Bayer), and ENGENIA® Herbicide (available from BASF). The mixing involved mixing the test solution with the particular crop protectant concentrate. The mixture was observed immediately, 24 hours later, and 36 hours later with no precipitate formation or other signs of incompatibility being observed. Each of these eight solutions was allowed to sit for one week, after which the solutions were visually examined for formation of a precipitate or other signs of incompatibility, none of which were observed. Thus, Solution A was compatible with each of these products.

This test was repeated nine more times with solutions identical to Solution A, except that the iron level of each solution was modified, with similar results being achieved.

Example 6

Iron Uptake Studies

Greenhouse studies were completed to assess iron uptake, shoot mass, root diameter of corn treated according to the present disclosure. The preparation procedure described in Example 1 was followed to prepare the ten test formulations shown in Table 2.

per day. Each test plant received the same environmental exposure during growth.

Figure 4:
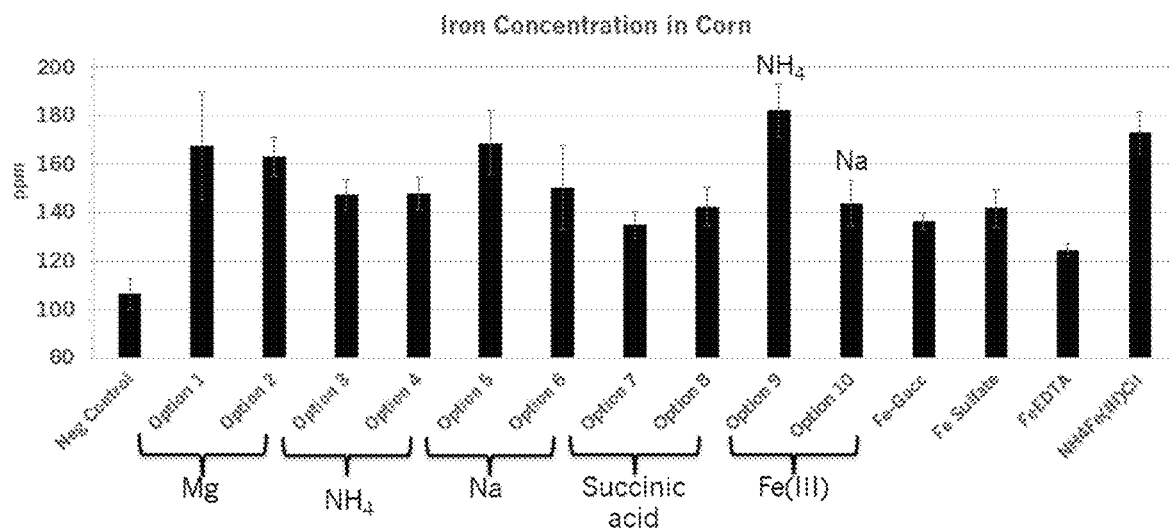
FIG. 4 is a graph comparing iron uptake in corn plants foliarly treated with various test formulations to the iron uptake in corn plants foliarly treated with a prior art formulation or a negative control (Example 6)

At the V3 stage of growth, a test formulation or a comparative formulation was applied foliarly to the corn at a rate of 0.25 gal/ac (2.3 L/Ha). The comparative formulations were iron glucoheptonate ("Fe-Gucc"; 6% Fe), iron sulfate ("Fe Sulfate"), iron chelated with EDTA ("FeEDTA"; 13% Fe), and ferric ammonium citrate ("NH4Fe(III)Cit"). One week after application, the plants were removed, dried at 12 hours at 220° C., grinded, and sent to a third-party laboratory (A & L Great Lakes Laboratories) for analysis of iron uptake. FIG. 4 gives those results, where it can be seen that each of Options 1 to 10 performed better than FeEDTA. Additionally, all of the test formulations performed comparable to, or better than, Fe-Gucc and FeSulfate, showing that Options 1 to 10 are each a viable alternative to prior art products.

Example 7

Effect of Application Rates

Corn test plants were grown as described in Example 6. At the V3 growth stage, three test formulations and two comparative formulations (FeEDTA and FeSO$_4$) were individually applied to test plants at application rates of 0.25 gal/ac (2.3 L/Ha), 0.5 gal/ac (4.7 L/Ha), 1.0 gal/ac (9.4 L/Ha), and 2.0 gal/ac (18.7 L/Ha). The three test formulations were Options 5 ("Na—Fe"), 2 ("Mg—Fe"), and 3 ("NH4-Fe") from Table 2.

Figure 5:
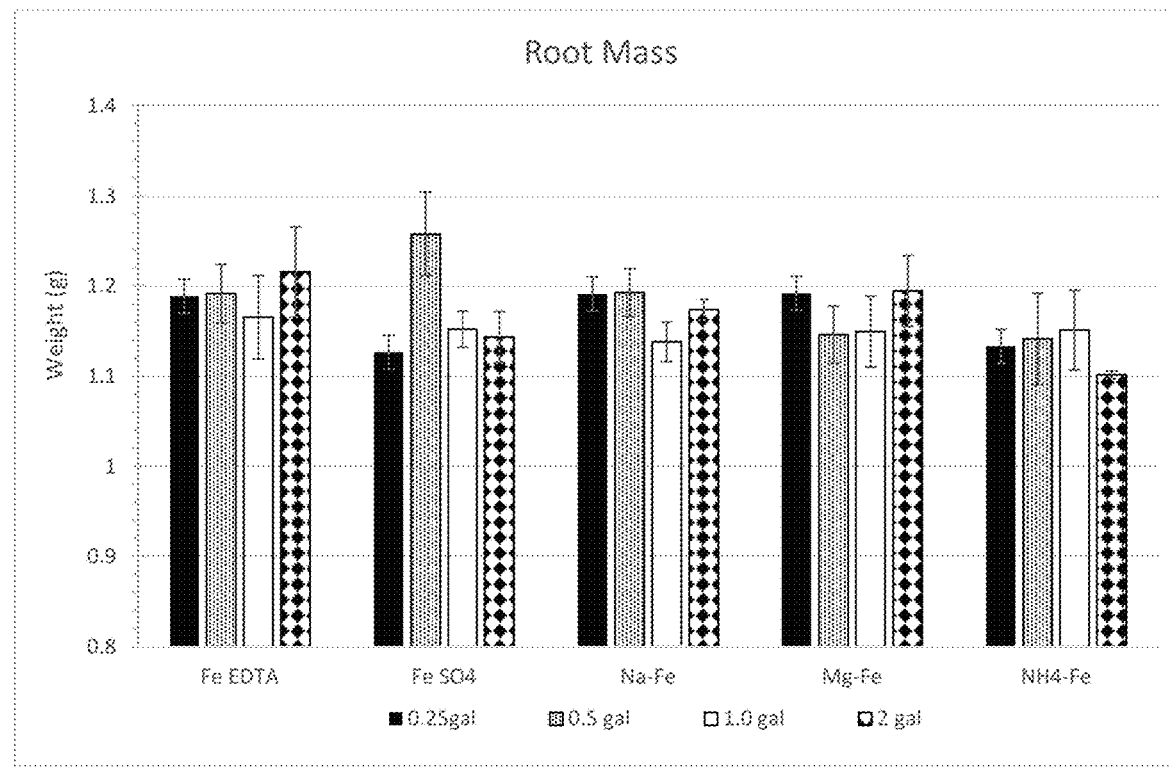
FIG. 5 is a graph comparing root mass of corn plants foliarly treated with various test formulations to the root mass of corn plants foliarly treated with a prior art formulation (Example 7)
Figure 6:
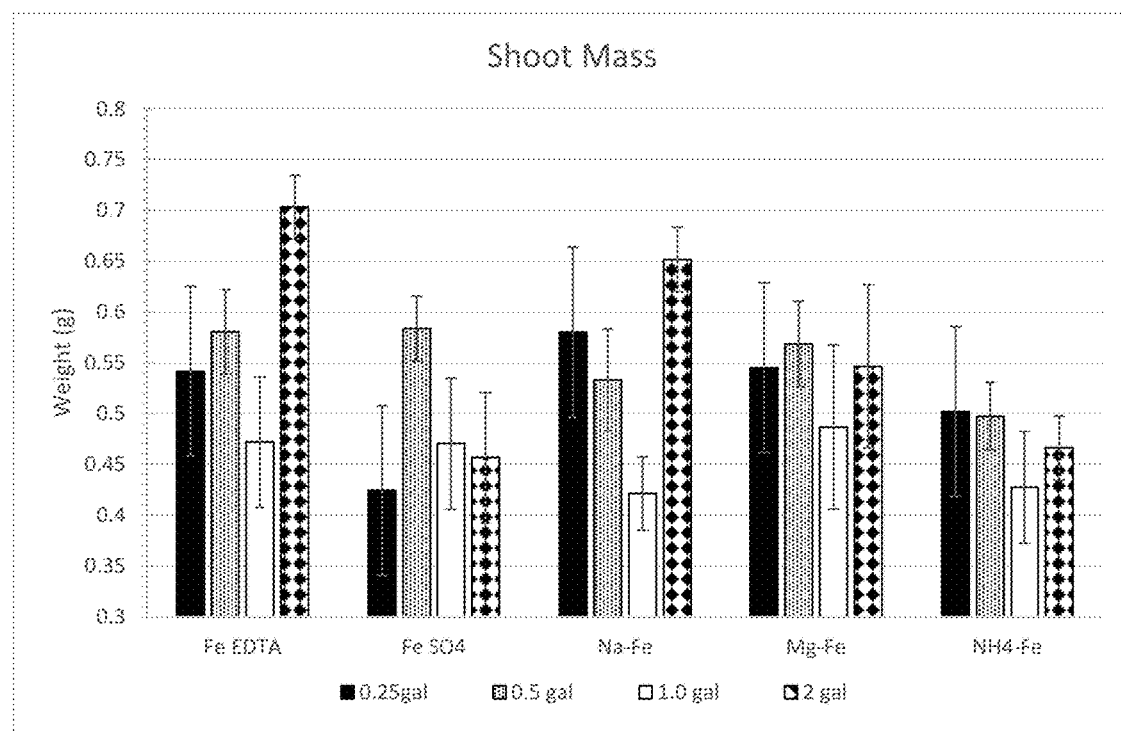
FIG. 6 is a graph comparing shoot mass of corn plants foliarly treated with various test formulations to the shoot mass of corn plants foliarly treated with a prior art formulation (Example 7)
Figure 7:
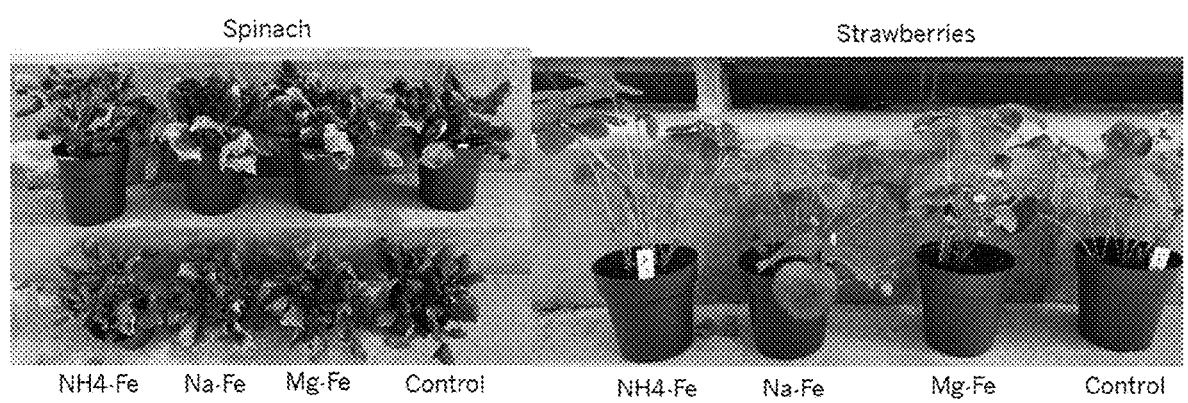
FIG. 7 is a photograph of spinach plants (top and side views) and strawberry plants foliarly treated with various test formulations as compared to negative control plants (Example 7)

One week after application, root and shoot masses were determined by drying the above- and below-ground biomass for 12 hours at 220° C., then weighing each plant to the third decimal in grams. These results are reported in FIGS. 5 and 6, where it can be seen that the test formulations generally

TABLE 2

| Raw Material | Option 1* | Option 2 | Option 3 | Option 4 | Option 5 | Option 6 | Option 7 | Option 8 | Option 9 | Option 10 |
|---|---|---|---|---|---|---|---|---|---|---|
| Iron(II) Sulfate Heptahydrate | 21.46 | 21.46 | 21.46 | 21.46 | 21.46 | 21.46 | 21.46 | 21.46 | — | — |
| Iron(III) Chloride | — | — | — | — | — | — | — | — | 14.52 | 14.52 |
| Mg(OH)$_2$ | 5.22 | 2.61 | — | — | — | — | — | — | — | — |
| NaOH-Dry | — | — | — | — | 7.16 | 3.58 | — | — | 15.74 | — |
| NH$_4$OH (30%) | — | — | 20.92 | 10.46 | — | — | 20.92 | 10.46 | — | 41.37 |
| Citric Acid Monohydrate | 12.54 | 6.27 | 12.54 | 6.27 | 12.54 | 6.27 | 12.54 | 6.27 | 12.54 | 12.54 |
| Malic Acid | 8.00 | 4.00 | 8.00 | 4.00 | 8.00 | 4.00 | — | — | 8.00 | 8.00 |
| Succinic Acid | — | — | — | — | — | — | 7.05 | 3.52 | — | — |
| Water | 52.77 | 65.66 | 37.08 | 57.81 | 50.83 | 64.69 | 38.04 | 58.29 | 49.19 | 23.56 |
| Fe % | 5.0 | 5.0 | 5.0 | 5.0 | 5.0 | 5.0 | 5.0 | 5.0 | 5.0 | 5.0 |
| N % | — | — | 3.1 | 1.5 | — | — | 3.1 | 1.5 | — | 6.0 |
| Mg % | 2.2 | 1.1 | — | — | — | — | — | — | — | — |
| SO4 % | 5.3 | 5.3 | 5.3 | 5.3 | 5.3 | 5.3 | 5.3 | 5.3 | — | — |
| Na % | — | — | — | — | 4.1 | 2.1 | — | — | 9.0 | — |
| Cl % | — | — | — | — | — | — | — | — | 9.5 | 9.5 |

*All values in this Table 2 are % by weight, based upon the total weight of the aqueous solution taken as 100% by weight.

Test plants (corn) were planted in 1 kg pots filled with a topsoil and sand mixture (50:50 using American Topsoil). A base fertilizer comprising water solution made with urea (N), and monoammonium phosphate (P), and potassium sulfate (K) was applied to each pot before planting. The application rate was of 100-50-50 lbs./acre NPK (112-56-56 kg/Ha). Approximately 100 mL of water was added per pot did not negatively affect root or shoot mass as compared to the prior art, even when over-applied.

A similar analysis was performed on spinach plants and strawberry plants, except the application rate was not varied but held at 0.5 gal/ac (4.7 L/Ha). The same test formulations were those applied to corn in this Example 7. This application was carried out one time after 1 week of growth and a second time one week later. These plants are shown in FIG.

7, along with a control plant (i.e., no foliar treatment). Again, no negative effects were observed.

Example 8

Chlorophyll Analysis

This study was carried out to determine the effect of cation (i.e., from the base) selection and metal oxidation state on total chlorophyll as well as to compare total chlorophyll levels of plants treated with test formulations to those treated with prior art formulations. Corn test plants were grown as described in Example 6. At the V3 growth stage, test formulations and comparative formulations were individually applied to test plants via foliar application. Control plants did not receive any foliar treatment.

One week after treatment, the total chlorophyll (i.e., both chlorophyll a and chlorophyll b) was determined in each test plant using the Arnon method (Arnon, D. I. (1949). Copper Enzymes in Isolated Chloroplasts. Polyphenoloxidase in *Beta vulgaris*. *Plant Physiology*, 24(1), 1). Five replicates were used for each treatment. For each replicate, 1 gram of fresh leaf tissue (from the youngest fully developed leaf) was used. Chlorophyll extractions were completed by cutting small pieces of leaves (~1 cm² each piece) and placing it in 20 ml of 80% acetone. This mixture was shaken at high speed for one hour. After shaking, the mixture was centrifuged for 3 minutes at 4,000 RPM to pellet leaf debris tissue. Finally, the supernatant was used to get readings at 663 nm and 645 nm using a UV-Vis Spectrometer. The following Arnon equation was used to find the total amount of chlorophyll (in mg) per gram of leaf tissue.

$$\frac{20.2(A_{645}) + 8.02(A_{663})}{W},$$

where

A=absorbance at either 645 nm or 663 nm; and

W=weight of leaf sample (in this case, 1 g).

Figure 8:
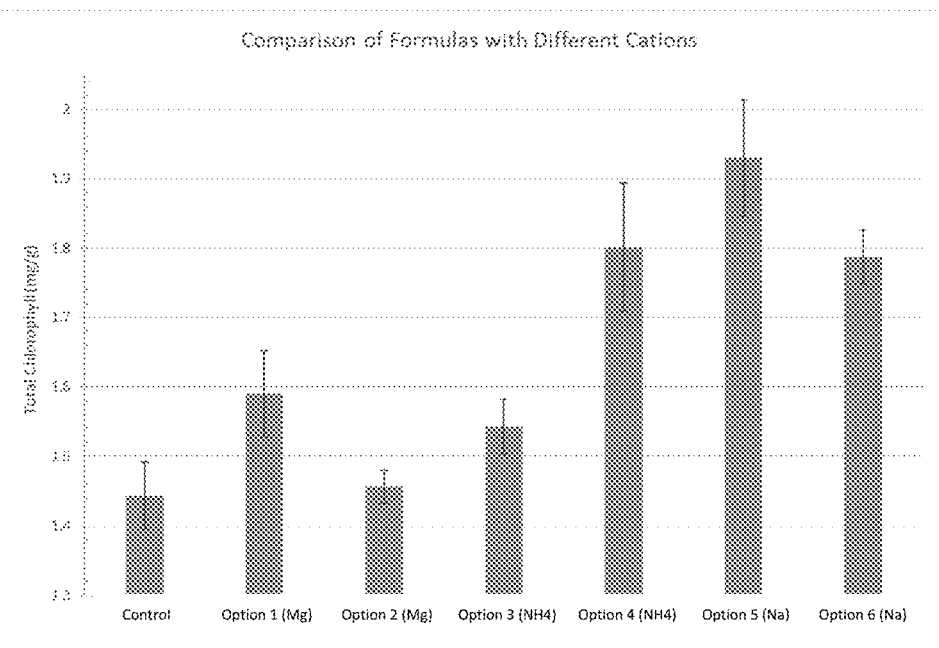
FIG. 8 is a graph comparing the total chlorophyll of corn plants foliarly treated with various test formulations (formed using different bases) to the total chlorophyll of control plants, as described in Example 8.
Figure 9:
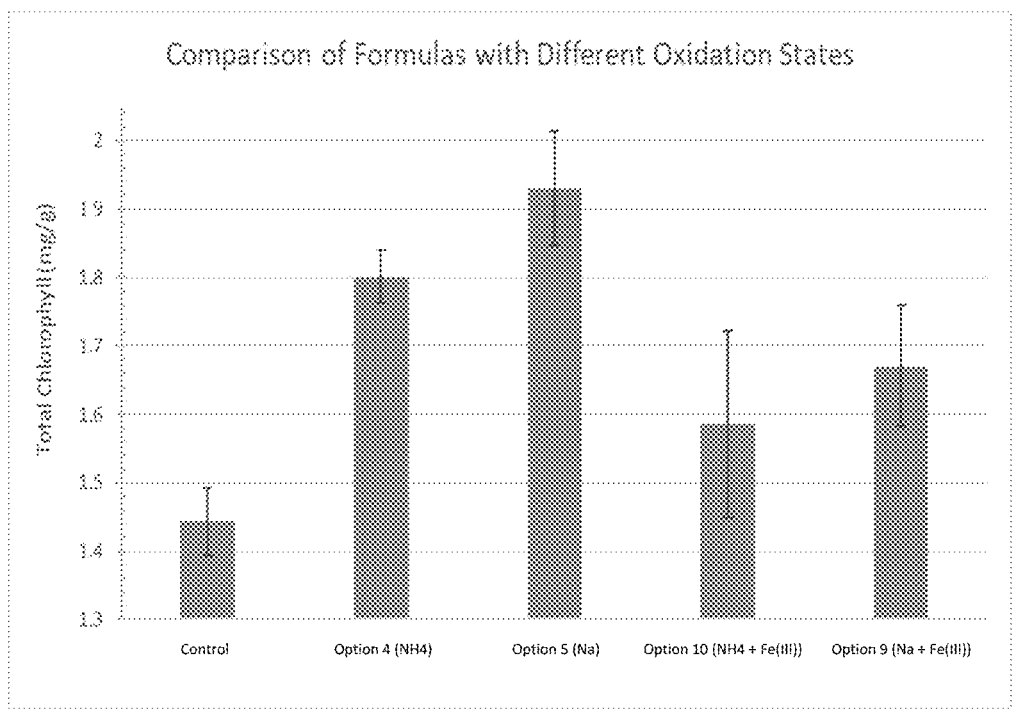
FIG. 9 is a graph comparing the total chlorophyll of corn plants foliarly treated with various test formulations with iron(II) or iron(III) to the total chlorophyll of control plants, as described in Example 8.
Figure 10:
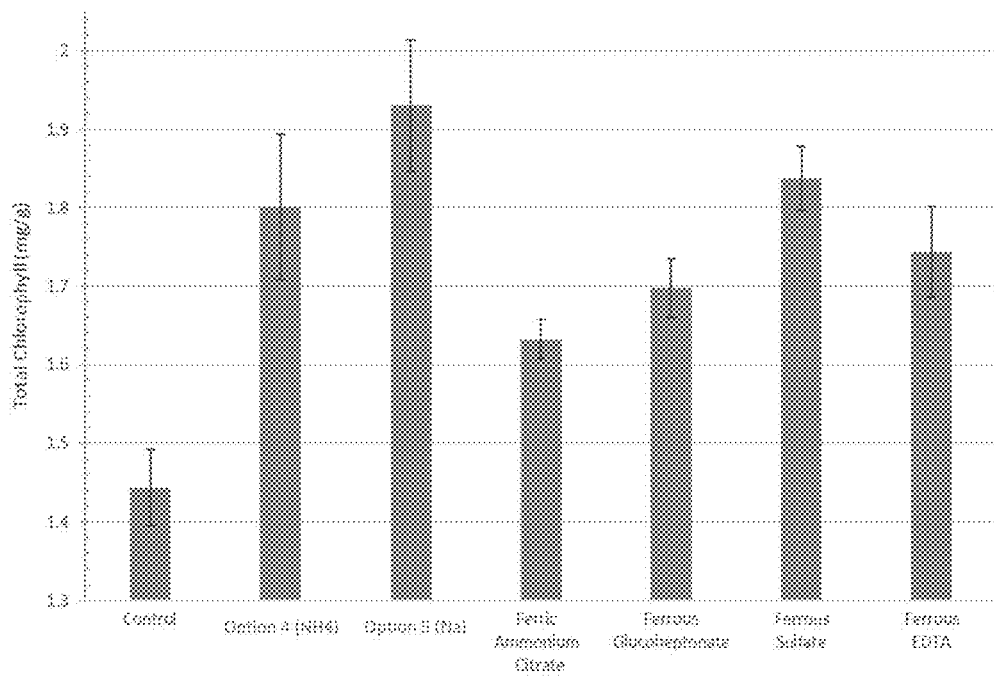
FIG. 10 is a graph comparing the total chlorophyll of corn plants foliarly treated with various test formulations to the total chlorophyll of control plants and of plants treated by commercially available formulations (Example 8)

The results are visually shown in FIGS. 8-10, respectively, where the y-axis shows the amount of chlorophyll (in mg per gram of tissue), and each bar on the x-axis shows the results for test treatments, comparative treatments, or control.

Referring to FIG. 8, the Na cation (from the NaOH base) was the highest performing one, although all cations from the particular base resulted in plants having total chlorophyll levels that were improved over the control. The improvements were 9.7% (Option 1), 1.4% (Option 2), 6.9% (Option 3), 25% (Option 4), 34.7% (Option 5), and 23.6% (Option 6) over the control.

As shown in FIG. 9, it was determined that the iron(II) oxidation state is more desirable than the control for achieving higher total chlorophyll levels, resulting in a 25% (Option 4) and 34.7% (Option 5) improvement over the control. However, the iron(III) oxidation state also performed better than the control, with a 9.7% (Option 10) and 15.3% (Option 9) improvement over the control.

FIG. 10 compares the performance of two test formulation (Options 4 and 5) to four prior art treatments as well as to a control. The improvement of Options 4 and 5 over the control was noted above. These two formulations also showed increased total chlorophyll levels over all four prior art treatments except for Option 4 compared to ferrous sulfate, which experience a slight decrease but still performed well. These % improvements are shown in Table 3.

TABLE 3

| TEST FORMU-LATION | FERRIC AMMONIUM CITRATE | FERROUS GLUCO-HEPTONATE | FERROUS SULFATE | FERROUS EDTA |
|---|---|---|---|---|
| Option 4 | 10.4%* | 6.5% | −2.2% | 3.3% |
| Option 5 | 18.4% | 14.2% | 4.9% | 10.9% |

*For positive values, % increase of Option 4 or 5 over the particular comparative formulation. % decrease for negative value.

Example 9

Greenhouse Lettuce Study

In this study, a test formulation was used to treat leafy lettuce and compared to a control and prior art formulations. Lettuce plants were planted in 1-kg pots filled with a growing media (Pro-Mix HP Growing Medium, available from Premier Tech Horticulture Office, Quakertown, Pa., USA) and grown under a low iron fertilizer plan. A base fertilizer comprising water solution made with urea (N), and monoammonium phosphate (P), and potassium sulfate (K) was applied to each pot before planting. The application rate was 100-50-50 lbs./acre NPK (112-56-56 kg/Ha). Approximately 100 mL of water was added per pot per day. Each test plant received the same environmental exposure during growth.

Eighteen days after planting, the particular test formulation or comparative formulation was applied foliarly to the lettuce at a rate of 1,800 Fe ppm. A second application was applied one week later at the same rate. Control plants received no foliar treatment. There were five replicates for each test plant as well as the control plant. The test formulation ("Option 11") according to the present disclosure is shown in Table 4. The comparative treatments were $FeSO_4$ (6% by weight Fe), SOYGREEN® EDDHA (1.80% by weight Fe; available from CHS Agronomy), and FeEDTA (13% by weight Fe).

TABLE 4

| Option 11 Formulation | |
|---|---|
| RAW MATERIAL | % by Weight |
| Iron(II) Sulfate Heptahydrate | 29.87 |
| Magnesium Hydroxide | 3.13 |
| Citric Acid Anhydrous | 6.95 |
| Malic Acid | 4.85 |
| Glycerol | 0.50 |
| Clariant Synergen GA | 1.00 |
| Clariant Synergen W10 | 0.25 |
| PC 5450 | 0.30 |
| Water | 54.63 |
| TOTAL | 100.0 |

The plants were analyzed for leaf chlorophyll concentrations using a Soil Plant Analysis Development ("SPAD") chlorophyll meter (SPAD 502 Plus Chlorophyll Meter, from Spectrum Technologies, Inc.), which enables an in situ, nondestructive technique. That is, not sample processing was required, and the tests were carried out on live plants. Readings were taken immediately before the first foliar treatment and again at 72 hours after the second foliar treatment, and the % SPAD increase of each sample was determined.

Figure 11:
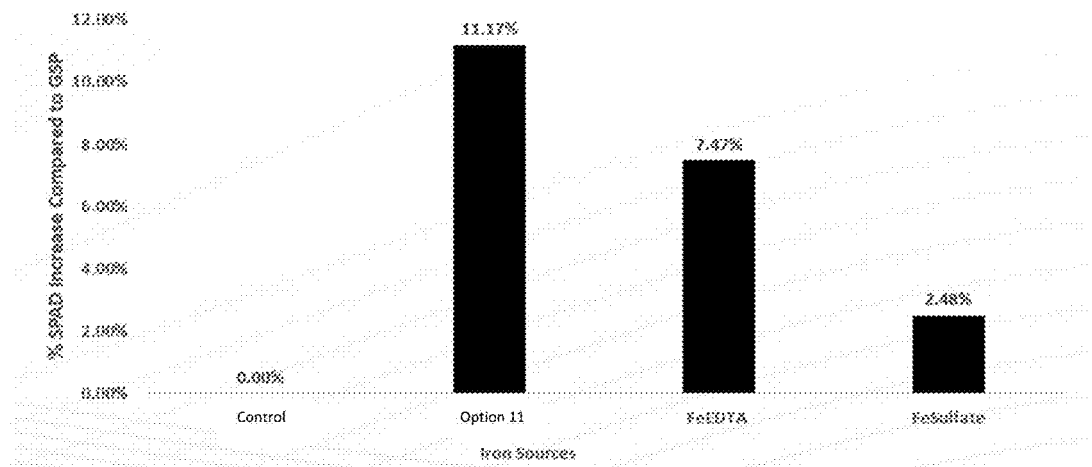
FIG. 11 is a graph comparing the total chlorophyll of leafy lettuce plants foliarly treated with a test formulation to the total chlorophyll of control plants and of plants treated by commercially available formulations (Example 9)

These results are shown in FIG. 11. The results for the comparative treatment of Fe-EDDHA are not shown because this treatment was accidentally applied twice, so that the results would not truly be comparative. The Option 11 treatment showed a 49.5% greater increase compared to that of the FeEDTA treatment, and a 350.4% greater increase compared to that of the FeSulfate treatment.

Iron concentrations for the various plants were also determined and compared at the time of harvest, which was at least 3 days after the last treatment application. Again, each treatment had five replicates. All samples were washed in acetic acid and rinsed before being prepared for analysis by Inductively Coupled Plasma ("ICP") Spectroscopy. Dried samples were combusted at 450° C. and extracted with concentrated hydrochloric acid, followed by analysis using ICP.

Figure 12:
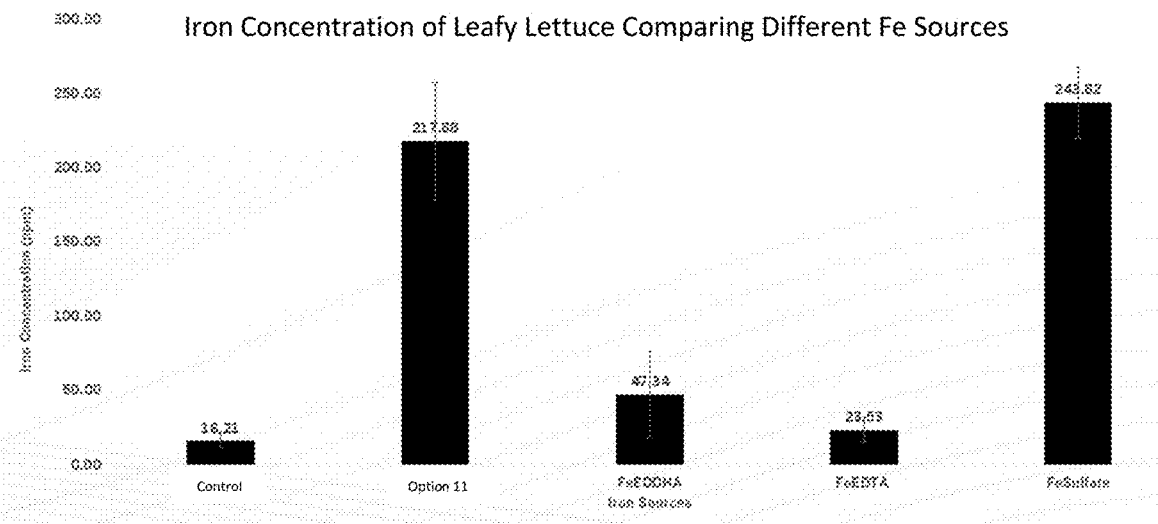
FIG. 12 is a graph comparing the iron concentration of leafy lettuce plants foliarly treated with a test formulation to the iron concentration of control plants and of plants treated by commercially available formulations (Example 9)

The iron concentration results are shown in FIG. 12. The Option 11 treatment plants had 13.4 times more iron than the control plants, 4.6 times the iron of the plants treated with FeEDDHA, and 9.3 times the iron of the plants treated with FeEDTA. The Option 11 treatment plants had about 89.4% of the iron that the FeSulfate plants had. It is believed that these results are likely because Fe-EDTA and Fe-EDDHA are large molecules, making it more difficult to enter the leaf tissue, while Fe-Sulfate, on the other hand, is a smaller molecule.

Example 10

Zn Test Formulations

In this procedure, seventy-five total Zn formulations were prepared to determine performance at different conditions. Table 5 shows the starting formulation, where "AA," "AB," etc., are sample identifiers. In each of the seventy-five formulations, the citric acid to malic acid molar ratio was maintained at 50:50 and a Zn concentration of at least 7.5% by weight was achieved, although this testing leads to the conclusion that a Zn concentration of at least 8-9% is also feasible.

TABLE 5

Starting Formulation

| Starting Formulation | AA* (g) | AB (g) | AC (g) | AD (g) | AE (g) |
|---|---|---|---|---|---|
| Zinc Sulfate Monohydrate | 4.29 | 4.56 | 4.82 | 5.09 | 5.36 |
| Magnesium Hydroxide | 0.68 | 0.72 | 0.76 | 0.80 | 0.84 |
| Citric Acid | 2.22 | 2.36 | 2.50 | 2.64 | 2.78 |
| MalicAcid | 1.55 | 1.65 | 1.75 | 1.84 | 1.94 |
| Water | 10.85 | 10.30 | 9.76 | 9.21 | 8.67 |
| Total | 20.00 | 20.00 | 20.00 | 20.00 | 20.00 |

*"AA," "AB," etc., are sample identifiers in Tables 5-18.

1. Base Adjustments

Using the Table 5 formulations as a starting point, twenty additional formulations were prepared where only the quantity of base (i.e., Mg(OH)$_2$) was altered from the Table 5 starting formulation, with water level being adjusted to offset the base adjustment. All other ingredients were maintained constant. The base was reduced by 10% (Table 6), reduced by 20% (Table 7), increased by 10% (Table 8), and increased by 20% (Table 9).

TABLE 6

Base Reduced by 10%

| −10% Formulation | AF (g) | AG (g) | AH (g) | AI (g) | AJ (g) |
|---|---|---|---|---|---|
| Zinc Sulfate Monohydrate | 4.29 | 4.56 | 4.82 | 5.09 | 5.36 |
| Magnesium Hydroxide | 0.61 | 0.65 | 0.68 | 0.72 | 0.76 |
| Citric Acid | 2.22 | 2.36 | 2.50 | 2.64 | 2.78 |
| Malic Acid | 1.55 | 1.65 | 1.75 | 1.84 | 1.94 |
| Water | 10.92 | 10.38 | 9.83 | 9.29 | 8.75 |
| Total | 20.00 | 20.00 | 20.00 | 20.00 | 20.00 |

TABLE 7

Base Reduced by 20%

| −20% Formulation | AP (g) | AQ (g) | AR (g) | AS (g) | AT (g) |
|---|---|---|---|---|---|
| Zinc Sulfate Monohydrate | 4.29 | 4.56 | 4.82 | 5.09 | 5.36 |
| Magnesium Hydroxide | 0.54 | 0.57 | 0.61 | 0.64 | 0.68 |
| Citric Acid | 2.22 | 2.36 | 2.50 | 2.64 | 2.78 |
| Malic Acid | 1.55 | 1.65 | 1.75 | 1.84 | 1.94 |
| Water | 10.99 | 10.45 | 9.91 | 9.37 | 8.83 |
| Total | 20.00 | 20.00 | 20.00 | 20.00 | 20.00 |

TABLE 8

Base Increased by 10%

| +10% Formulation | AK (g) | AL (g) | AM (g) | AN (g) | AO (g) |
|---|---|---|---|---|---|
| Zinc Sulfate Monohydrate | 4.29 | 4.56 | 4.82 | 5.09 | 5.36 |
| Magnesium Hydroxide | 0.74 | 0.79 | 0.84 | 0.88 | 0.93 |
| Citric Acid | 2.22 | 2.36 | 2.50 | 2.64 | 2.78 |
| Malic Acid | 1.55 | 1.65 | 1.75 | 1.84 | 1.94 |
| Water | 10.78 | 10.23 | 9.68 | 9.13 | 8.58 |
| Total | 20.00 | 20.00 | 20.00 | 20.00 | 20.00 |

TABLE 9

Base Increased by 20%

| +20% Formulation | AU (g) | AV (g) | AW (g) | AX (g) | AY (g) |
|---|---|---|---|---|---|
| Zinc Sulfate Monohydrate | 4.29 | 4.56 | 4.82 | 5.09 | 5.36 |
| Magnesium Hydroxide | 0.81 | 0.86 | 0.91 | 0.96 | 1.01 |
| Citric Acid | 2.22 | 2.36 | 2.50 | 2.64 | 2.78 |
| Malic Acid | 1.55 | 1.65 | 1.75 | 1.84 | 1.94 |
| Water | 10.72 | 10.16 | 9.61 | 9.05 | 8.50 |
| Total | 20.00 | 20.00 | 20.00 | 20.00 | 20.00 |

2. Acids Adjustments

Using the Table 5 formulations as a starting point again, twenty additional formulations were prepared where only the quantities of acids (i.e., the citric acid and malic acid) were altered from the Table 5 starting formulation, with water levels being adjusted to offset the acids adjustment. All other ingredients were maintained constant. The acids were reduced by 10% (Table 10), reduced by 20% (Table 11), increased by 10% (Table 12), and increased by 20% (Table 13).

TABLE 10

| Acids Reduced by 10% | | | | | |
|---|---|---|---|---|---|
| −10% Formulation | BE (g) | BF (g) | BG (g) | BH (g) | BI (g) |
| Zinc Sulfate Monohydrate | 4.29 | 4.56 | 4.82 | 5.09 | 5.36 |
| Magnesium Hydroxide | 0.68 | 0.72 | 0.76 | 0.80 | 0.84 |
| Citric Acid | 2.00 | 2.13 | 2.25 | 2.38 | 2.50 |
| Malic Acid | 1.40 | 1.48 | 1.57 | 1.66 | 1.75 |
| Water | 11.2 | 10.7 | 10.2 | 9.7 | 9.1 |
| Total | 20.00 | 20.00 | 20.00 | 20.00 | 20.00 |

TABLE 11

| Acids Reduced by 20% | | | | | |
|---|---|---|---|---|---|
| −20% Formulation | BO (g) | BP (g) | BQ (g) | BR (g) | BS (g) |
| Zinc Sulfate Monohydrate | 4.29 | 4.56 | 4.82 | 5.09 | 5.36 |
| Magnesium Hydroxide | 0.68 | 0.72 | 0.76 | 0.80 | 0.84 |
| Citric Acid | 1.78 | 1.89 | 2.00 | 2.11 | 2.22 |
| Malic Acid | 1.24 | 1.32 | 1.40 | 1.47 | 1.55 |
| Water | 11.6 | 11.1 | 10.6 | 10.1 | 9.6 |
| Total | 20.00 | 20.00 | 20.00 | 20.00 | 20.00 |

TABLE 12

| Acids Increased by 10% | | | | | |
|---|---|---|---|---|---|
| +10% Formulation | BJ (g) | BK (g) | BL (g) | BM (g) | BN (g) |
| Zinc Sulfate Monohydrate | 4.29 | 4.56 | 4.82 | 5.09 | 5.36 |
| Magnesium Hydroxide | 0.68 | 0.72 | 0.76 | 0.80 | 0.84 |
| Citric Acid | 2.45 | 2.60 | 2.75 | 2.91 | 3.06 |
| Malic Acid | 1.71 | 1.81 | 1.92 | 2.03 | 2.13 |
| Water | 10.5 | 9.9 | 9.3 | 8.8 | 8.2 |
| Total | 20.00 | 20.00 | 20.00 | 20.00 | 20.00 |

TABLE 13

| Acids Increased by 20% | | | | | |
|---|---|---|---|---|---|
| +20% Formulation | BT (g) | BU (g) | BV (g) | BW (g) | BX (g) |
| Zinc Sulfate Monohydrate | 4.29 | 4.56 | 4.82 | 5.09 | 5.36 |
| Magnesium Hydroxide | 0.68 | 0.72 | 0.76 | 0.80 | 0.84 |
| Citric Acid | 2.67 | 2.84 | 3.00 | 3.17 | 3.34 |
| Malic Acid | 1.86 | 1.98 | 2.10 | 2.21 | 2.33 |
| Water | 10.1 | 9.5 | 8.9 | 8.3 | 7.7 |
| Total | 20.00 | 20.00 | 20.00 | 20.00 | 20.00 |

3. Nutrient Adjustment

Using the Table 5 formulations as a starting point again, twenty additional formulations were prepared where only the quantity of nutrient (i.e., the zinc sulfate monohydrate) was altered from the Table 5 starting formulation, with water level being adjusted to offset the nutrient quantity adjustment. All other ingredients were maintained constant. The nutrient was reduced by 10% (Table 14), reduced by 20% (Table 15), increased by 10% (Table 16), and increased by 20% (Table 17).

TABLE 14

| Nutrient Reduced by 10% | | | | | |
|---|---|---|---|---|---|
| −10% Option | CD (g) | CE (g) | CF (g) | CG (g) | CH (g) |
| Zinc Sulfate Monohydrate | 3.86 | 4.10 | 4.34 | 4.58 | 4.82 |
| Magnesium Hydroxide | 0.68 | 0.72 | 0.76 | 0.80 | 0.84 |
| Citric Acid | 2.22 | 2.36 | 2.50 | 2.64 | 2.78 |
| Malic Acid | 1.55 | 1.65 | 1.75 | 1.84 | 1.94 |
| Water | 11.3 | 10.8 | 10.2 | 9.7 | 9.2 |
| Total | 20.00 | 20.00 | 20.00 | 20.00 | 20.00 |

TABLE 15

| Nutrient Reduced by 20% | | | | | |
|---|---|---|---|---|---|
| −20% Option | CN (g) | CO (g) | CP (g) | CQ (g) | CR (g) |
| Zinc Sulfate Monohydrate | 3.43 | 3.64 | 3.86 | 4.07 | 4.29 |
| Magnesium Hydroxide | 0.68 | 0.72 | 0.76 | 0.80 | 0.84 |
| Citric Acid | 2.22 | 2.36 | 2.50 | 2.64 | 2.78 |
| Malic Acid | 1.55 | 1.65 | 1.75 | 1.84 | 1.94 |
| Water | 11.7 | 11.2 | 10.7 | 10.2 | 9.7 |
| Total | 20.00 | 20.00 | 20.00 | 20.00 | 20.00 |

TABLE 16

| Nutrient Increased by 10% | | | | | |
|---|---|---|---|---|---|
| +10% Option | CI (g) | CJ (g) | CK (g) | CL (g) | CM (g) |
| Zinc Sulfate Monohydrate | 4.72 | 5.01 | 5.31 | 5.60 | 5.90 |
| Magnesium Hydroxide | 0.68 | 0.72 | 0.76 | 0.80 | 0.84 |
| Citric Acid | 2.22 | 2.36 | 2.50 | 2.64 | 2.78 |
| Malic Acid | 1.55 | 1.65 | 1.75 | 1.84 | 1.94 |
| Water | 10.4 | 9.8 | 9.3 | 8.7 | 8.1 |
| Total | 20.00 | 20.00 | 20.00 | 20.00 | 20.00 |

TABLE 17

| Nutrient Increased by 20% | | | | | |
|---|---|---|---|---|---|
| +20% Option | CS (g) | CT (g) | CU (g) | CV (g) | CW (g) |
| Zinc Sulfate Monohydrate | 5.15 | 5.47 | 5.79 | 6.11 | 6.43 |
| Magnesium Hydroxide | 0.68 | 0.72 | 0.76 | 0.80 | 0.84 |
| Citric Acid | 2.22 | 2.36 | 2.50 | 2.64 | 2.78 |
| Malic Acid | 1.55 | 1.65 | 1.75 | 1.84 | 1.94 |
| Water | 10.0 | 9.4 | 8.8 | 8.2 | 7.6 |
| Total | 20.00 | 20.00 | 20.00 | 20.00 | 20.00 |

4. Molar Ratios

The molar ratios of nutrient, base, and acids are set forth in Table 18.

TABLE 18

Molar Ratios

| Sample | Nutrient* | Base | Acids |
|---|---|---|---|
| AA | 1.00 | 1.00 | 1.00 |
| AB | 1.00 | 1.00 | 1.00 |
| AC | 1.00 | 1.00 | 1.00 |
| AD | 1.00 | 1.00 | 1.00 |
| AE | 1.00 | 1.00 | 1.00 |
| AF | 1.00 | 0.90 | 1.00 |
| AG | 1.00 | 0.90 | 1.00 |
| AH | 1.00 | 0.90 | 1.00 |
| AI | 1.00 | 0.90 | 1.00 |
| AJ | 1.00 | 0.90 | 1.00 |
| AK | 1.00 | 1.10 | 1.00 |
| AL | 1.00 | 1.10 | 1.00 |
| AM | 1.00 | 1.10 | 1.00 |
| AN | 1.00 | 1.10 | 1.00 |
| AO | 1.00 | 1.10 | 1.00 |
| AP | 1.00 | 0.80 | 1.00 |
| AQ | 1.00 | 0.80 | 1.00 |
| AR | 1.00 | 0.80 | 1.00 |
| AS | 1.00 | 0.80 | 1.00 |
| AT | 1.00 | 0.80 | 1.00 |
| AU | 1.00 | 1.20 | 1.00 |
| AV | 1.00 | 1.20 | 1.00 |
| AW | 1.00 | 1.20 | 1.00 |
| AX | 1.00 | 1.20 | 1.00 |
| AY | 1.00 | 1.20 | 1.00 |
| BE | 1.00 | 1.00 | 0.90 |
| BF | 1.00 | 1.00 | 0.90 |
| BG | 1.00 | 1.00 | 0.90 |
| BH | 1.00 | 1.00 | 0.90 |
| BI | 1.00 | 1.00 | 0.90 |
| BJ | 1.00 | 1.00 | 1.10 |
| BK | 1.00 | 1.00 | 1.10 |
| BL | 1.00 | 1.00 | 1.10 |
| BM | 1.00 | 1.00 | 1.10 |
| BN | 1.00 | 1.00 | 1.10 |
| BO | 1.00 | 1.00 | 0.80 |
| BP | 1.00 | 1.00 | 0.80 |
| BQ | 1.00 | 1.00 | 0.80 |
| BR | 1.00 | 1.00 | 0.80 |
| BS | 1.00 | 1.00 | 0.80 |
| BT | 1.00 | 1.00 | 1.20 |
| BU | 1.00 | 1.00 | 1.20 |
| BV | 1.00 | 1.00 | 1.20 |
| BW | 1.00 | 1.00 | 1.20 |
| BX | 1.00 | 1.00 | 1.20 |
| CD | 1.00 | 1.11 | 1.11 |
| CE | 1.00 | 1.11 | 1.11 |
| CF | 1.00 | 1.11 | 1.11 |
| CG | 1.00 | 1.11 | 1.11 |
| CH | 1.00 | 1.11 | 1.11 |
| CI | 1.00 | 0.91 | 0.91 |
| CJ | 1.00 | 0.91 | 0.91 |
| CK | 1.00 | 0.91 | 0.91 |
| CL | 1.00 | 0.91 | 0.91 |
| CM | 1.00 | 0.91 | 0.91 |
| CN | 1.00 | 1.25 | 1.25 |
| CO | 1.00 | 1.25 | 1.25 |
| CP | 1.00 | 1.25 | 1.25 |
| CQ | 1.00 | 1.25 | 1.25 |
| CR | 1.00 | 1.25 | 1.25 |
| CS | 1.00 | 0.83 | 0.83 |
| CT | 1.00 | 0.83 | 0.83 |
| CU | 1.00 | 0.83 | 0.83 |
| CV | 1.00 | 0.83 | 0.83 |
| CW | 1.00 | 0.83 | 0.83 |

*Refers to Zn rather than to Zinc Sulfate Monohydrate

5. Condition Testing

Each of the prepared samples were kept for at least four full days sequentially at/under each of the following conditions: room temperature, 4° C., 45° C., and mixed with glyphosate (at room temperature). After the end of each condition and before moving to the next condition, each sample was visually observed to determine if any precipitate had formed and, if so, to what degree (e.g., very fine material, heavy precipitate).

All samples performed well at room temperature for at least four days except for BN, BX, CM, and CW. Of the remaining samples, AP, AQ, AR, AS, AF, AG, AA, AB, AK, AL, AU, AV, AZ, BA, BB, BC, BE, BF, BG, BH, BI, BJ, BK, BL, BM, BO, BP, BQ, BR, BS, BT, BU, BV, BW, BY, BZ, CA, CB, CD, CE, CF, CG, CH, CI, CJ, CK, CN, CO, CP, CQ, CR, CS, and CT performed the best, with no precipitate being observed at all. The remaining samples had minimal precipitate formation.

Most samples also performed well at 4° C. for at least four days as well. The best performers at this temperature were AP, AF, AA, AK, AU, AZ, BE, BF, BG, BH, BJ, BK, BO, BP, BQ, BR, BS, BT, BU, BY, CD, CE, CF, CG, CH, CI, CJ, CN, CO, CP, CQ, CR, and CS, with no precipitate observed at all. Samples AQ, AR, AG, AH, AI, AB, AC, AD, AL, AM, AN, AV, AW, AX, BA, BB, BL, BV, BW, BX, BZ, CA, CK, CL, CT, and CU also performed rather well, with only minimal precipitate being observed.

When held at 45° C. for at least four days, all samples performed well except BX, CM, CV, and CW. AS, AT, AI, AJ, AD, AE, AN, AO, AX, AY, BC, BD, BN, BW, CB, CC, CH, CK, CL, CT, and CU only had minimal precipitate, and the remaining samples did not precipitate at all.

Finally, the samples that performed best after at least four days of being mixed with glyphosate were AF, AA, AK, AU, CD, CE, CF, CN, CO, CP, CQ, and CR.

The foregoing results indicated that the formulation could be customized depending upon the final use and the conditions of the final use. For example, if the formulation is likely to encounter elevated temperature during transport, storage, and/or use, selecting a formulation other than BX, CM, CV, or CW would be ideal. If the formulation was going to be mixed with glyphosate, then formulations AF, AA, AK, AU, CD, CE, CF, CN, CO, CP, CQ, or CR would be ideal. In instances where the formulation would be mixed with glyphosate, and it must be stable at the widest range of temperatures possible, formulations AF, AA, AK, AU, CD, CE, CF, CG, CN, CO, CP, CQ, and CR were deemed to be the most suitable.

Example 11

Fe Furrow Application Trial (Soybeans)

1. Soil Preparation

Alkaline soil having a pH of 7.9 was made by mixing air-dried Michigan topsoil (sieved) and fine sand (50:50, v/v). Next, 0.5% w/w calcium hydroxide was added to the soil-sand mixture and mixed well. Water was then added (15% v/v), and the pots were kept in that condition for a week to allow time for alkalinity fully develop. The pH was checked, and the soil was then added to 1-liter pots. There were thirty pots total, providing five replicates for each of the six treatments described below.

2. Seedling Growth Procedure

Soybean seeds (FS HISOY® Soybeans) were planted in trays filled with sieved topsoil. A base fertilizer comprising water solution made with urea (N), and monoammonium phosphate (P), and potassium sulfate (K) was applied to each tray before planting. The application rate was of 50-50-50 ppm NPK. Seedlings were irrigated with DI water. The trays were kept in a plant growth chamber so that each seedling received the same environmental exposure during growth.

3. Plant Growth Procedure

Sixteen days after the seeds were planted as described in Part 2 of this Example, the seedlings were transplanted to the pots prepared in Part 1 of this Example. A fertilizer solution was prepared by mixing 16.67 g of Nova PeKacid® 0-60-20 (a phosphorus and potassium fertilizer, available from ICL Specialty Fertilizers), 13.33 g of SOP fertilizer, and 11.2 L of DI water. At the time of transplant, 56.5 mL of this fertilizer solution were added to each pot, and this same fertilizer solution application was repeated weekly until harvest.

A micronutrient fertilizer solution was prepared by mixing the compounds of Table 19 in 1 L of DI water. At the time of transplanting, 10 mL of this micronutrient fertilizer solution was added to each pot. This application was not repeated during the growth cycle.

TABLE 19

| Fertilizer | Elem % | Elem (mg/pot) | Fert (mg/pot) | mg Fert for 1 L (10 mL/pot) |
|---|---|---|---|---|
| $ZnSO_4 \cdot H_2O$ | 35.5 | 10 | 28.17 | 2816.9 |
| Boric acid | 17.5 | 5 | 28.57 | 2857.1 |
| $MnSO_4 \cdot H_2O$ | 32 | 10 | 31.25 | 3125.0 |
| $CuSO_4 \cdot 5H_2O$ | 25 | 5 | 20.00 | 2000.0 |

Using a pipette, an iron test solution (comparative or Option 11 solution from Example 9—see Table 20) was applied about 1 cm below the soil surface, near each plant except for the negative control. This was the only iron test solution application.

TABLE 20

| No | Trt/Product | Fe in stock % | Fe rate (mg/pot) | Dilution rate (g/50 mL) | Application rate (ml/pot) |
|---|---|---|---|---|---|
| 1 | Neg. Con. | — | — | — | — |
| 2 | FeEDDHA | 1.8 | 0.616 | 4.281 | 0.4 |
| 3 | FeEDTA | 13.0 | 0.616 | 0.593 | 0.4 |
| 4 | $FeSO_4 \cdot H_2O$ | 6.0 | 0.616 | 1.284 | 0.4 |
| 5* | Option 11-A | 6.0 | 0.616 | 1.284 | 0.4 |
| 6* | Option 11-B | 6.0 | 1.000 | 2.084 | 0.4 |

*Same formulations but different application rate.

All plants received about 100 mL of DI water every other day.

4. Plant Analysis i. SPAD Measurements

Thirty-six days after transplantation, the plants were harvested. SPAD measurements were taken as described Example 9. Fully grown youngest trifoliate and second youngest trifoliate were selected for these SPAD measurements. A total of nine readings were taken per trifoliate (3 per leaf). Table 21 provides these results.

TABLE 21

Average SPAD measurements of soybean plants treated with different types of iron in furrow at transplanting and harvested at V3-stage.

| | Youngest trifoliate (young) | | Second youngest trifoliate (old) | |
|---|---|---|---|---|
| Treatment | Average SPAD value | Std. error | Average SPAD value | Std. error |
| NC | 33.00 | 1.532 | 30.48 | 1.787 |
| FeEDDHA | 30.96 | 2.533 | 30.84 | 3.512 |
| FeEDTA | 39.12 | 1.577 | 37.94 | 1.087 |
| $FeSO_4$ | 32.98 | 1.180 | 30.74 | 1.207 |
| Option 11-A | 32.72 | 1.684 | 35.58 | 2.137 |
| Option 11-B | 30.84 | 1.606 | 29.06 | 1.685 |

(ii) Biomass Measurements

Shoot and root biomasses were also determined, following the procedure described in Example 7. These results are in Table 22, where it can be seen that the test solutions performed comparable to that of the comparative solutions.

TABLE 22

Average shoot and root biomasses of soybean plants treated with different types of iron in furrow at transplanting and harvested at V3-stage.

| | Shoot | | Root | |
|---|---|---|---|---|
| Treatment | Average dry biomass (g) | Std. error | Average dry biomass (g) | Std. error |
| NC | 2.085 | 0.130 | 0.575 | 0.024 |
| FeEDDHA | 2.111 | 0.246 | 0.551 | 0.089 |
| FeEDTA | 2.276 | 0.041 | 0.650 | 0.021 |
| $FeSO_4$ | 1.992 | 0.151 | 0.540 | 0.051 |
| Option 11-A | 2.169 | 0.153 | 0.570 | 0.060 |
| Option 11-B | 2.205 | 0.130 | 0.674 | 0.060 |

(iii) Iron Uptake

Iron uptake was determined using ICP as described in Example 9. Those results are found in Table 23, where it can be seen that all solutions performed better than the control while the solution according to the disclosure performed comparable to, and in some instances better than, the comparative solutions.

TABLE 23

Average Fe uptake by soybean shoots and roots treated with different types of iron in furrow at transplanting and harvested at V3-stage.

| | Shoot | | Root | |
|---|---|---|---|---|
| Treatment | μg/plant | Std. error | μg/plant | Std. error |
| NC | 149.69 | 11.17 | 150.10 | 20.90 |
| FeEDDHA | 148.63 | 30.11 | 124.30 | 25.74 |
| FeEDTA | 188.92 | 17.06 | 183.64 | 5.71 |
| $FeSO_4$ | 116.20 | 14.98 | 172.17 | 13.27 |
| Option 11-A | 162.34 | 29.77 | 143.66 | 21.71 |
| Option 11-B | 169.87 | 21.19 | 210.15 | 29.49 |

(iv) Fe(III) Reductase Gene Expression

Figure 13:
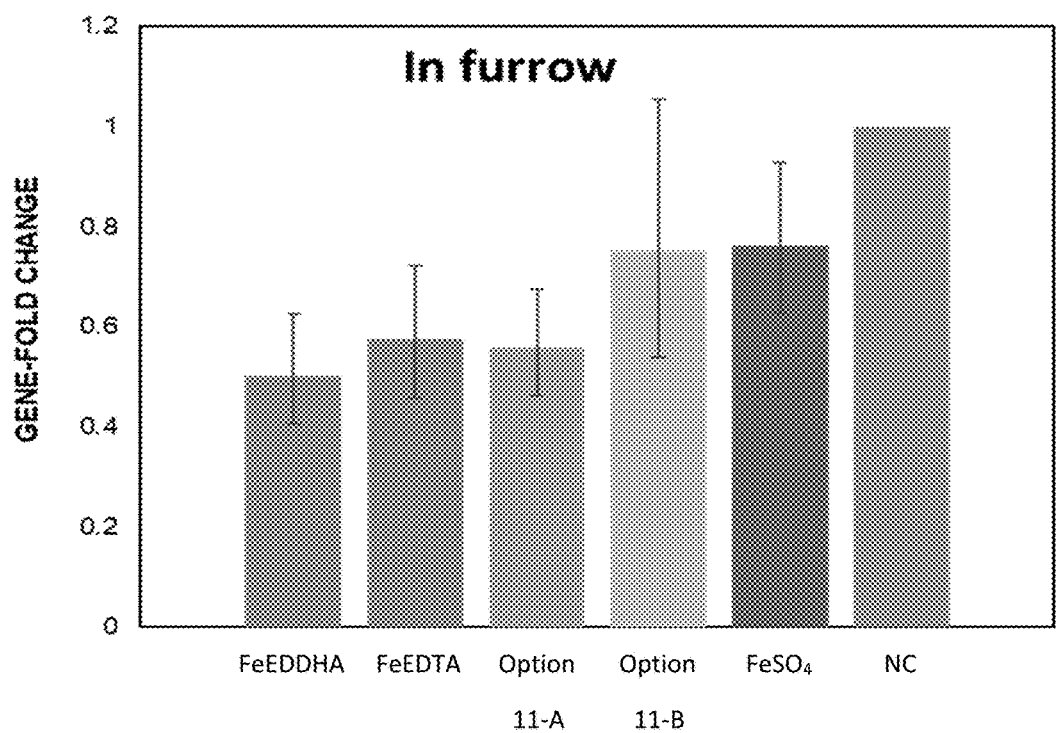
FIG. 13 is a graph showing the Fe(III) reductase gene expression of soybeans grown in soil treated according to this disclosure as compared to a control and commercially available formulations (Example 11)

The Fe(III) reductase gene expression is inversely related to the presence of iron in a plant. Thus, the lower the iron in the plant, the higher the gene expression. Expression was tested in each of the plants by extracting RNA from the youngest trifoliate leaves and quantifying the target RNA by qPCR. These results are shown in FIG. 13, where it can be seen that all solutions performed substantially better than the control while the solutions according to the disclosure performed comparable to, and in some instances better than, the comparative solutions.

Example 12

Fe Foliar Application Trial (Soybeans)

Figure 14:
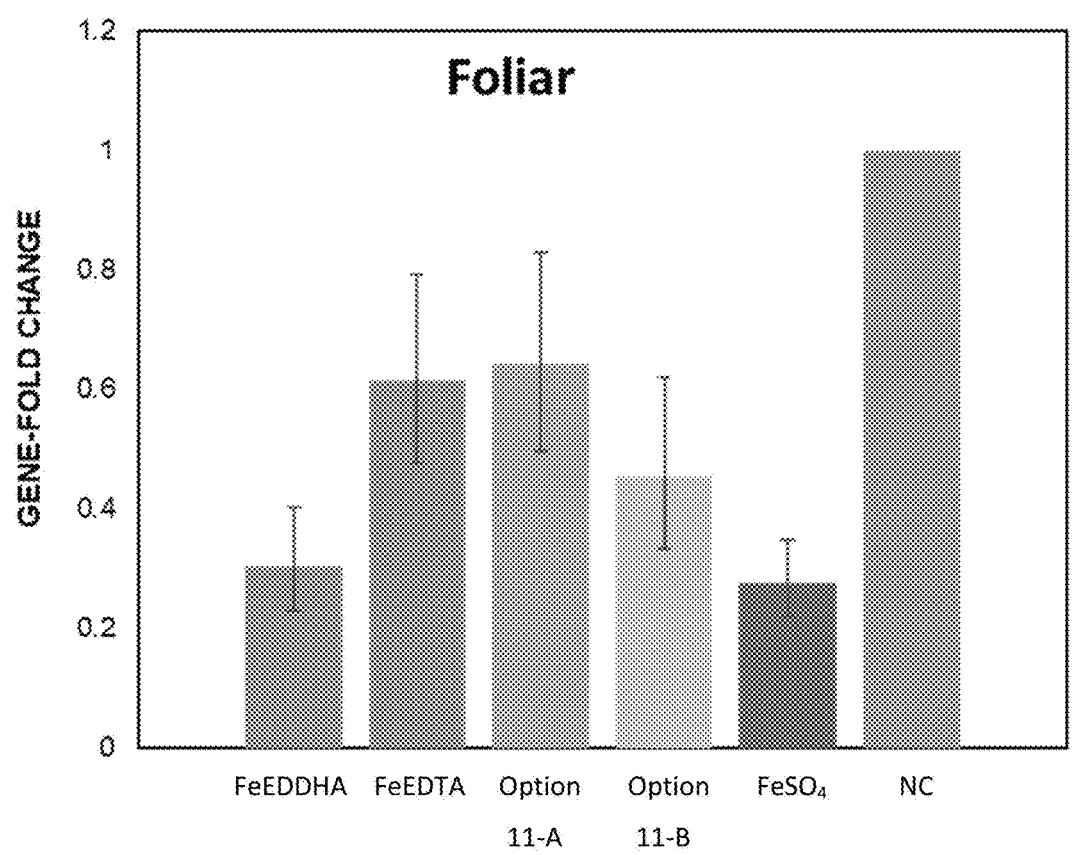
FIG. 14 is a graph showing the Fe(III) reductase gene expression of soybeans foliarly treated according to this disclosure as compared to a control and commercially available formulations (Example 12)

Example 11 was exactly repeated except that instead of treating the soil with an iron solution by pipetting the solution at the time of transplantation, the plants were treated foliarly at V3 stage of growth and harvested 1 week after treatment. The SPAD, biomass, and iron uptake results can be found in Tables 24-26, respectively, while the Fe(III) reductase gene expression results can be found in FIG. 14. Again, it can be seen that all solutions performed substantially better than the control while the solutions according to the disclosure performed comparable to, and in some instances better than, the comparative solutions, showing they are a viable alternative to currently available products.

TABLE 24

SPAD values of youngest and second youngest leaves of soybean plants foliarly treated with different types of iron at V3 stage and harvested after 1 week of treatment.

| Treatment | Youngest trifoliate (young) | | Second youngest trifoliate (old) | |
| --- | --- | --- | --- | --- |
| | Average SPAD value | Std. error | Average SPAD value | Std. error |
| NC | 32.80 | 1.552 | 27.76 | 1.701 |
| FeEDDHA | 33.20 | 3.319 | 33.54 | 2.804 |
| FeEDTA | 32.06 | 2.551 | 32.74 | 0.859 |
| FeSO$_4$ | 33.64 | 1.598 | 29.84 | 1.647 |
| Option 11-A | 35.76 | 0.887 | 32.12 | 2.394 |
| Option 11-B | 33.80 | 1.888 | 29.46 | 2.995 |

TABLE 25

Average dry biomass of shoots and roots of soybean plants foliarly treated with different types of iron at V3 stage and harvested after 1 week of treatment.

| Treatment | Shoot | | Root | |
| --- | --- | --- | --- | --- |
| | Average weight/plant (g) | Std. error | Average weight/plant (g) | Std. error |
| NC | 2.229 | 0.098 | 0.584 | 0.040 |
| FeEDDHA | 2.261 | 0.088 | 0.606 | 0.039 |
| FeEDTA | 2.514 | 0.194 | 0.661 | 0.086 |
| FeSO$_4$ | 2.199 | 0.145 | 0.601 | 0.039 |
| Option 11-A | 2.711 | 0.115 | 0.784 | 0.042 |
| Option 11-B | 2.207 | 0.147 | 0.584 | 0.058 |

TABLE 26

Average Fe uptake by shoots and roots of soybean plants foliarly treated with different types of iron at V3 stage and harvested after 1 week of treatment.

| Treatment | Shoot | | Root | |
| --- | --- | --- | --- | --- |
| | µg/plant | Std. error | µg/plant | Std. error |
| NC | 196.82 | 9.73 | 162.88 | 12.91 |
| FeEDDHA | 276.05 | 5.58 | 250.73 | 27.36 |
| FeEDTA | 348.28 | 48.34 | 246.69 | 23.69 |
| FeSO$_4$ | 217.88 | 26.76 | 273.02 | 19.81 |
| Option 11-A | 258.02 | 16.43 | 322.64 | 13.57 |
| Option 11-B | 220.84 | 19.60 | 235.54 | 22.69 |

Example 13

Fe Application Petri Dish Trial (Wheat)

Figure 15:
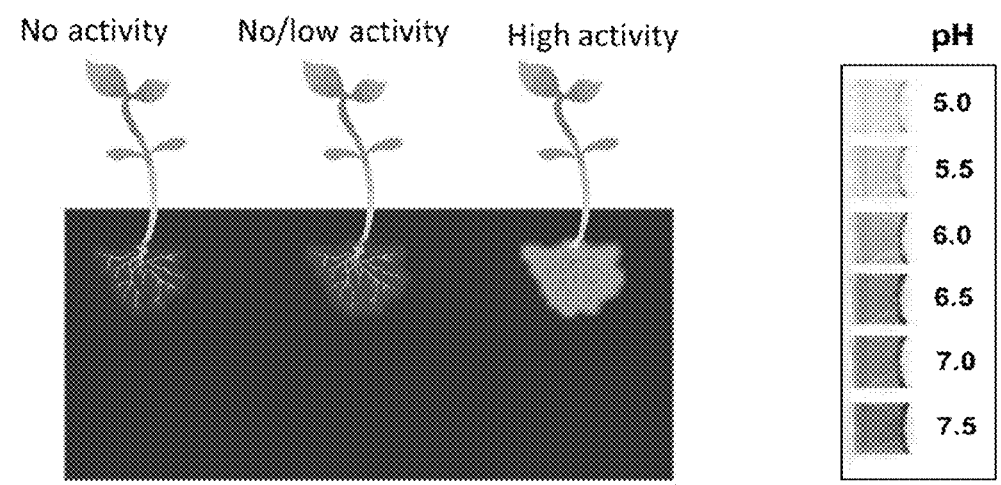
FIG. 15 is a photograph depicting the degree of acid exuded by wheat plant roots treated according to the disclosure as compared to wheat plant roots treated with a prior art treatment as well as a control (Example 13).
Figure 15:
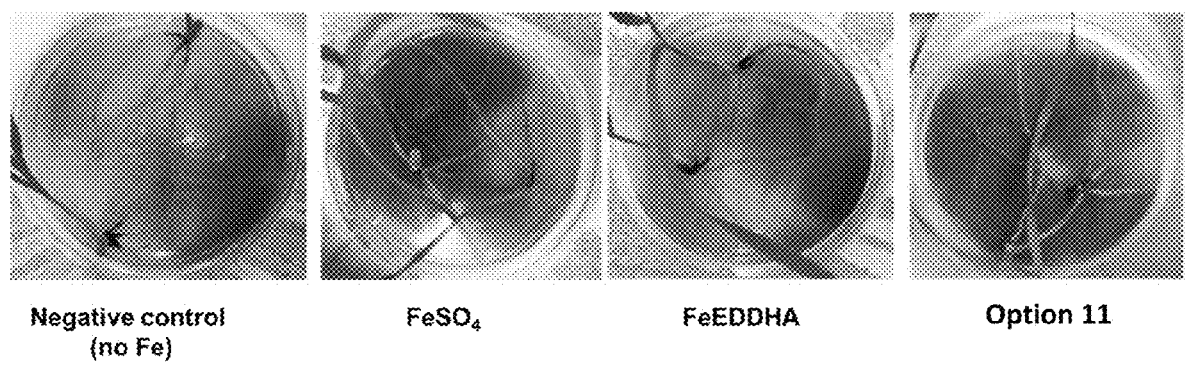

Wheat seedlings were grown using the same conditions as described for the soybean seedlings of Example 11. After the wheat seedlings were 10 days old, their roots were washed with DI water and put into DI water for one day. On the following day, the leaves of the seedlings were dipped in a 40 ppm Fe solution for 30 minutes. The roots were then placed on bromocresol purple agar plates (pH 7.5, without a buffer) and covered with plastic cups (2 plants/plate). On the $10^{th}$ day, the plants were visually observed. As noted in Example 11, the Fe(III) reductase gene expression is activated under iron deficiency. When this gene is activated, plant roots release acids, and the rhizosphere is acidified. That is, certain phenolic acids are exuded by the plant roots to extract iron from the soil, so iron deficiency can be correlated to a lower pH, and vice versa. FIG. 15 is a photograph showing the color of the agar plates. As shown in the top half of the figure, the presence of lighter color (or the more yellow, to the right of the root images and to the top of the pH chart) near the roots shows high gene activity (i.e., a low/acidic pH) while the darker the color (or the more purple, to the left of the root images and at the bottom of the pH chart) indicates lower gene activity (i.e., a neutral or near-neutral pH), which means the plants are not lacking iron. The results of FIG. 15 indicated that the roots of the plant treated with the Option 11 solution according to this disclosure had higher iron than the roots of all other treatment

We claim:

1. An aqueous nutrient formulation comprising:
    a micronutrient complexed with first and second organic acids, and
    a non-ionic surfactant;
    wherein the nutrient formulation has a pH of from about 2 to about 6; and
    wherein the first and second organic acids are individually selected from the group consisting of citric acid, malic acid, oxalic acid, malonic acid, succinic acid, glutaric acid, adipic acid, aconitic acid, tartaric acid, fumaric acid, propane-1,2,3-tricarboxylic acid, trimesic acid, glutaconic acid, mesaconic acid, tartronic acid, aspartic acid, pimelic acid, suberic acid, azelaic acid, sebacic acid, and combinations thereof.

2. The formulation of claim 1, wherein said first organic acid is a dicarboxylic acid and said second carboxylic acid is a tricarboxylic acid.

3. The formulation of claim 2, wherein the ratio of tricarboxylic acid to dicarboxylic acid is from about 40:60 to about 60:40.

4. The formulation of claim 1, wherein said micronutrient is not chelated with said first or second organic acids.

5. The formulation of claim 1, wherein said micronutrient is selected from the group consisting of zinc, nickel, copper, manganese, iron, cobalt, selenium, titanium, lanthanum, and combinations thereof.

6. The formulation of claim 1, wherein:
said micronutrient is iron, zinc, or a combination thereof;
said first organic acid is malic acid; and
said second organic acid is citric acid.

7. The formulation of claim 1, further comprising a salt selected from the group consisting of ammonium chloride, ammonium sulfate, ammonium chloride, sodium chloride, sodium sulfate, sodium nitrate, magnesium chloride, magnesium sulfate, magnesium nitrate, potassium chloride, potassium sulfate, potassium nitrate, calcium chloride, calcium sulfate, calcium nitrate, and combinations of the foregoing.

8. The formulation of claim 1, wherein when 75% by weight of the micronutrient solution having 5% by weight of the micronutrient is mixed with 25% by weight of a 50% phosphonate solution and permitted to sit for about one week, the resulting mixture will have less than about 3% by weight precipitate.

9. The combination of a plant and a formulation according to claim 1 on at least some of said plant.

10. The combination of claim 9, wherein said composition is in contact with a leaf of the plant.

11. The combination of claim 9, wherein said plant is selected from the group consisting of soybean plants, tomato plants, corn plants, wheat plants, potato plants, and lettuce plants.

12. A method of providing nutrients to plants, said method comprising contacting a formulation according to claim 1 with said plant and/or soil in which said plant is planted.

13. The method of claim 12, wherein said plant is selected from the group consisting of soybean plants, tomato plants, corn plants, wheat plants, potato plants, and lettuce plants.

14. The method of claim 12, wherein said contacting comprises applying the formulation to a leaf of the plant at the V3 stage of growth and at about one week after said applying, one or more of the following is achieved:
said plant has a micronutrient level that is at least about 20% greater than that of a control plant grown under the same conditions but without said applying;
said plant has a micronutrient level that is at least about 5% greater than that of a plant grown under the same conditions but without said applying and with treatment by a composition comprising the micronutrient chelated with EDTA;
said plant has a chlorophyll content that is at least about 5% greater than that of a control plant grown under the same conditions but without said applying; or
said plant has a chlorophyll content that is at least about 3% greater than that of a plant grown under the same conditions but without said applying and with treatment by a composition comprising the micronutrient chelated with EDTA.

15. A method of forming a nutrient formulation comprising reacting a source of a micronutrient with at least two organic acids in the presence of water and a base so as to form a non-chelated complex of said micronutrient with at least one of said organic acids; wherein the nutrient formulation has a pH of from about 2 to about 6; and
wherein the at least two organic acids are selected from the group consisting of citric acid, malic acid, oxalic acid, malonic acid, succinic acid, glutaric acid, adipic acid, aconitic acid, tartaric acid, fumaric acid, propane-1,2,3-tricarboxylic acid, trimesic acid, glutaconic acid, mesaconic acid, tartronic acid, aspartic acid, pimelic acid, suberic acid, azelaic acid, sebacic acid, and combinations thereof; and
wherein the nutrient formulation comprises a non-ionic surfactant.

16. The method of claim 15, wherein said non-chelated complex is formed with said at least two organic acids.

* * * * *